(12) United States Patent
Croxford et al.

(10) Patent No.: US 11,379,713 B2
(45) Date of Patent: Jul. 5, 2022

(54) NEURAL NETWORK PROCESSING

(71) Applicants: Apical Limited, Cambridge (GB); Arm Limited, Cambridge (GB)

(72) Inventors: Daren Croxford, Swaffham Prior (GB); Ashley Miles Stevens, Austin, TX (US)

(73) Assignees: Apical Limited, Cambridge (GB); Arm Limited, Cambridge (GB)

( * ) Notice: Subject to any disclaimer, the term of this patent is extended or adjusted under 35 U.S.C. 154(b) by 609 days.

(21) Appl. No.: 16/214,058

(22) Filed: Dec. 8, 2018

(65) Prior Publication Data

US 2020/0184320 A1 Jun. 11, 2020

(51) Int. Cl.
G06N 3/063 (2006.01)
G06N 3/04 (2006.01)
G06F 15/78 (2006.01)

(52) U.S. Cl.
CPC ........... G06N 3/063 (2013.01); G06F 15/781 (2013.01); G06N 3/0481 (2013.01)

(58) Field of Classification Search
CPC ..... G06N 3/063; G06N 3/0481; G06F 15/781
USPC .......................................................... 706/15
See application file for complete search history.

(56) References Cited

U.S. PATENT DOCUMENTS

2014/0142929 A1 5/2014 Seide et al.
2020/0387800 A1* 12/2020 Du ..................... G06N 3/0454

FOREIGN PATENT DOCUMENTS

| CN | 112948126 | 6/2021 |
|----|-----------|--------|
| EP | 3343460 | 7/2018 |
| EP | 3502975 A1 | 6/2019 |
| WO | 2018/222299 A1 | 12/2018 |
| WO | 2019/2043555 A1 | 10/2019 |

OTHER PUBLICATIONS

Sawaguchi et al., "Slightly-slacked dropout for improving neural network learning on FGPA", ICT Express 4 (2018) 75-80 (Year: 2018).*
Examination Report in Application No. GB1917894.6 dated Jun. 29, 2021, 3 pages.
Abadi et al., "Tensorflow: Large-scale machine learning on heterogeneous distributed systems." arXiv preprint arXiv:1603.04467, available at https://arxiv.org/abs/1603.04467, Mar. 14, 2016, 19 pages.

(Continued)

Primary Examiner — Tsu-Chang Lee
(74) Attorney, Agent, or Firm — Vierra Magen Marcus LLP

(57) ABSTRACT

A data processing system operable to process a neural network, and comprising a plurality of processors. The data processing system is operable to determine whether to perform neural network processing using a single processor or using plural processors. When it is determined that plural processors should be used, a distribution of the neural network processing among two or more of the processors is determined and the two or more processors are each assigned a portion of the neural network processing to perform. A neural network processing output is provided as a result of the processors performing their assigned portions of the neural network processing.

16 Claims, 24 Drawing Sheets

(56) References Cited

OTHER PUBLICATIONS

Leroux et al., "The Cascading Neural Network: Building the Internet of Smart Things." Knowledge and Information Systems 52, No. 3 (2017), 28 pages.
GB 1917894.6—Examination Report dated May 22, 2020, 8 pages.
Combined Search and Examination Report dated Dec. 2, 2021, Application No. GB2105900.1.
Combined Search and Examination Report dated Mar. 11, 2022, Application No. GB2105900.1.

* cited by examiner

NEURAL NETWORK PROCESSING

BACKGROUND

The technology described herein relates to the execution of neural networks on electronic devices.

Neural networks can be used for processes such as machine learning, for example in, computer vision, and natural language processing operations. It is becoming increasingly common for neural networks to be employed on portable electronic devices, such as mobile phones, tablets, and other devices for these purposes.

Neural networks may, for example, be operable to process complex input data (e.g. image data, sound data such as voice data, or other data) and provide a desired output (e.g. an identification of an object within an image, or a spoken word within a sound clip, or other useful output inferred from the input data). This process is usually known as "inferencing" or "classification".

The neural network processing for "inferencing" or "classification" may comprise a number of layers of processing. The layers of processing may operate in turn, one after the other, to successively process input data and eventually identify features from the input data. For example, each layer may process an input data array to provide an output data array (which becomes the input data array for the next layer).

The layers of neural network may comprise, for example, an input layer, one or more convolutional and/or pooling layers, one or more fully connected layers, and an output layer, which may operate one after the other. A neural network comprising convolutional and/or pooling layers may be referred to as a convolutional neural network (CNN).

The input layer may be operable to provide input data to a subsequent (e.g. convolutional, pooling or fully connected) layer of the neural network, in a suitable form for the subsequent processing (e.g. as a data array).

Each of the convolutional and/or pooling layers may operate on an input data array (received from a previous layer of neural network processing), e.g. to extract one or more features from the input data array, and to produce a feature map which represents or is derived from features that were present in the input data array. The feature map may be generated by processing the input data array using a weight map (e.g. by convolving the input data array with the weight map).

One or more fully connected layers may also be provided after the convolutional and/or pooling layers to produce final output data (e.g. which classifies one or more features within the data that was input to the neural network, such as one or more objects in an input image).

The output layer may be operable to receive output data from a (convolutional, pooling, or a fully connected) layer, and to output the output data in a form that may be used by other components of the overall data processing system (e.g. in a form suitable for further processing, for storage, broadcasting, transmission, or display on a suitable display).

As well as "inferencing" or "classification", neural network processing may comprise "training" the neural network. "Training" may involve adjusting parameters for the neural network based on training input data, to ensure that the neural network will produce a desired output. The parameters which are adjusted may comprise one or more data arrays (e.g. weight maps) that are used during neural network processing.

As mentioned above, it is desired to perform neural network processing on electronic devices (and particularly portable devices). It is furthermore desired to adequately perform all of the required layers of processing in a manner that is efficient and suitable for use with portable electronic devices.

The Applicants believe that there is scope for improvements to the performing of neural network processing on electronic devices, such as portable devices.

BRIEF DESCRIPTION OF THE DRAWINGS

A number of embodiments of the technology described herein will now be described by way of example only and with reference to the accompanying drawings, in which.

DETAILED DESCRIPTION

Figure 1:
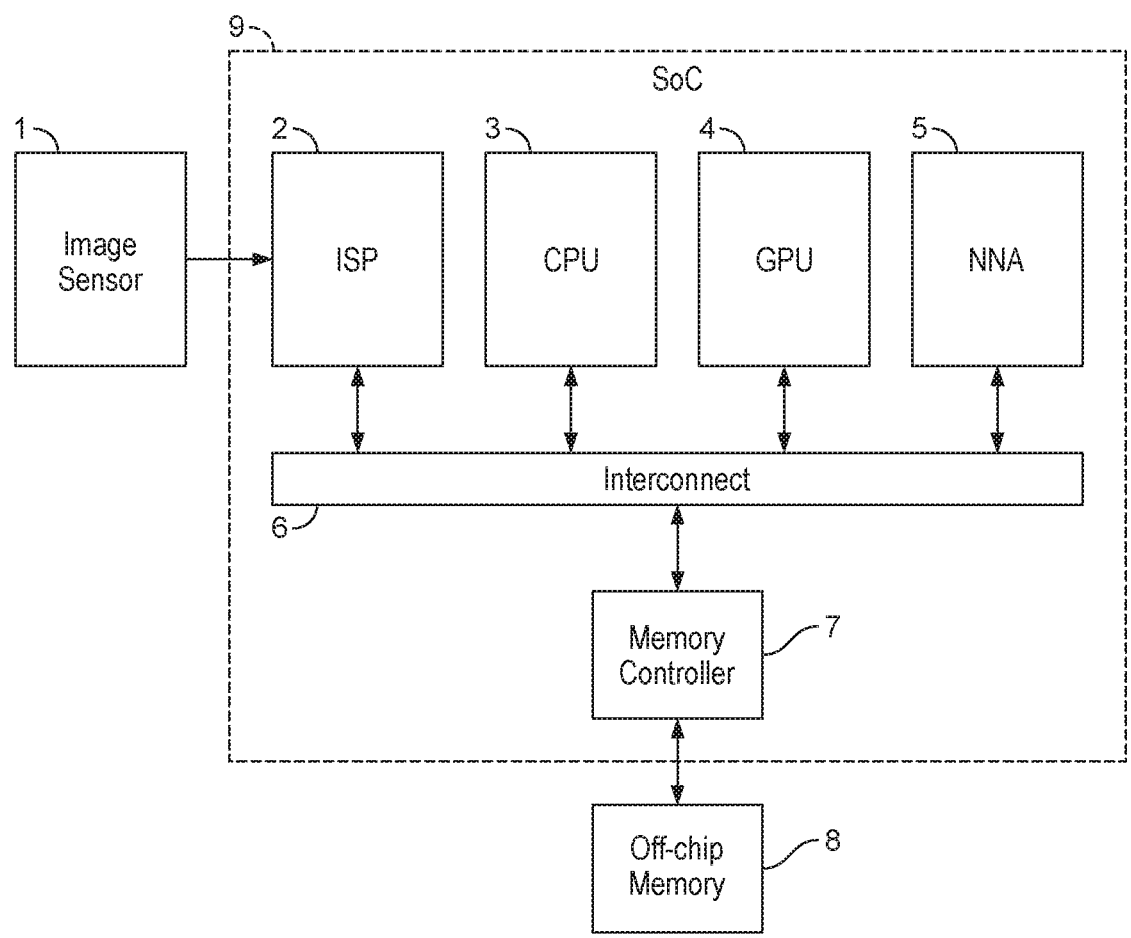
FIG. 1 shows a data processing system which may operable to perform neural network processing.

In an embodiment the technology described herein comprises a method of operating a data processing system, the data processing system comprising a plurality of processors each operable to perform neural network processing, the method comprising, when performing neural network processing:

determining whether to perform neural network processing using a single processor or using plural processors of the plurality of processors each operable to perform neural network processing; and when it is determined that plural processors should be used to perform the neural network processing:

determining a distribution of the neural network processing to two or more of the processors of the plurality of processors, such that each of the two or more processors is assigned a portion of the neural network processing;

distributing the portions of the neural network processing to said two or more of the processors according to the determined distribution;

performing the neural network processing by the two or more of the processors, wherein each of the processors performs neural network processing according to the portion of the neural network processing which it has been assigned, to thereby provide a neural network processing output.

In another embodiment, the technology described herein comprises a data processing system operable to process a neural network comprising:

a plurality of processors each operable to perform neural network processing; neural network processing determination circuit operable to:

determine whether to perform neural network processing using a single processor or using plural processors of the plurality of processors;

when it is determined that plural processors should be used to perform the neural network processing, determine a distribution of the neural network processing among two or more of the processors, and assign each of the two or more processors a portion of the neural network processing according the to the determined distribution; and distribute the portions of the neural network processing to said two or more of the processors according to the determined distribution;

wherein each of the processors is operable to perform neural network processing according to a portion of the neural network processing that it is has been assigned and which is received from the distribution circuit, to thereby provide a neural network processing output.

In the technology described herein, when neural network processing is to be performed, it is determined whether it is possible to divide the neural network processing among plural processors and, if so, the neural processing is distributed across plural processors.

In this regard, the Applicants have recognised that there may be more than one processor capable of performing neural network processing within a data processing system. The Applicants have further recognised that it may be possible to divide neural network processing among plural such processors, whilst still producing a suitable output. This is due, in part, to recognising that different portions of neural network processing may have predictable processing requirements, so that these parts can be assigned to different processors in accordance with, e.g., available processing capabilities of each of the processors.

Hence, the Applicants have recognised that neural network processing does not necessarily have to be executed solely on single processor (e.g. a dedicated neural network processor), but can reliably and effectively be distributed among plural processors.

Such distribution may improve the efficiency with which the neural network processing is performed, since it can make use of the processing capabilities of plural processors. It also enables the data processing system to be adaptable, and scalable.

This adaptability may be particularly useful when developing data processing systems that are "future-proof", since it is expected that neural network processing will become more complex and computationally intensive as neural networks are developed for performing a larger variety of more complex tasks. Hence, an individual processor that is currently capable of executing a neural network may not have sufficient capability to effectively execute future, more computationally intensive neural network processing in a timely fashion. This is particularly the case for portable electronic devices, where processing elements generally have limited capability due to cost limitations, physical size limitations, and requirements regarding the amount of heat that processors should generate when operating. The data processing system of the technology described herein is able to distribute neural network processing among plural processors, which may allow processing to be performed more efficiently than would be possible using a single processor alone.

The data processing system of the technology described herein may be implemented as part of any suitable electronic device which may be required to perform neural network processing, e.g., such as a desktop computer, a portable electronic device (e.g. a tablet or mobile phone), or other electronic device. Thus the technology described herein also extends to an electronic device that includes the data processing system of the technology described herein (and on which the data processing system operates in the manner of the technology described herein). The data processing system of the present may, in an embodiment, be implemented as part of a portable electronic device (such as a mobile phone, tablet, or other portable device).

The data processing system may comprise any desired components and elements that a data processing system can comprise, such as one or more or all of: a display processing unit (display processor), a central processing unit (CPU), a graphics processing unit (GPU) (graphics processor), a video processor, a digital signal processor, one or more neural network processors, a display and a memory.

The processors may be arranged within a system-on-chip system.

The data processing system may comprise memory for storing data, inter alia, relating to neural network processing. For example the memory may store input data, parameter (weight) data for use when processing layers of the neural network, input feature maps, output feature maps, and other data that will be used or generated when processing the neural network. The memory may comprise one or more local memories, which may be located on-chip. The local memory may comprise one or more buffers.

The memory may also comprise a main memory, which may be an external memory which may be located off-chip. The main (external) memory may be any suitable type of memory, such as SDRAM for example.

The data processing system (and in particular, the processors of the data processing system) may be operable to access data which is present in a local memory (buffer) when performing neural network processing. The data processing system may be operable to request data to be transferred from main (external) memory to local memory if data that is required is not already present in the local memory.

The data processing system of the technology described herein comprises plural processors which are capable of perform neural network processing. The processors which are capable of performing neural network processing may comprise, for example, (one or more of) any of the following: microcontroller units (MCUs), central processing units (CPUs), graphics processing units (GPUs) (graphics processors), video processors, sound processors, image signal processors (ISPs), digital signal processors, Neural Network Accelerator/Processors (NNAs), or other processors capable of performing neural network processing. The neural network processing will be distributed among two or more processors of the processors that are capable of performing neural network processing.

In an embodiment, the data processing system includes one or more neural network accelerators (NNAs), (i.e. processors which are configured or dedicated primarily to perform neural network processing). NNAs may be able to process a neural network more efficiently than the other processors listed above which are configured primarily to perform other functions. However, the technology described herein may use any type of processor for performing neural network processing, regardless of its primary function, as long as it is capable of performing neural network processing. In this way, the technology described herein may make use of plural processors that may already be present in a data processing system (e.g. as implemented on an electronic device), rather than requiring additional processors to be added to the data processing system.

In an embodiment, the neural network processing is distributed among NNAs only (which may be referred to as a "homogeneous" system). In another embodiment, the neural network processing may be distributed among a mixture of one or more NNAs and one or more other processors which are not NNAs (e.g. such as CPUs or GPUs). Alternatively, the distribution may not use any NNAs at all, such that in an embodiment the neural network is only distributed among processors which are not NNAs. Embodiments which utilise a mixture of different types of processor may be referred to as "heterogeneous" systems.

In the technology described herein, neural network processing may be distributed among plural processors.

In an embodiment, the data processing system of the technology described herein is operable to execute a neural network having any one or more of the features described herein with regards to neural networks. In an embodiment, the data processing system is operable to execute a neural network comprising one or more layers of processing.

The one or more layers of neural network processing may comprise one or more of any of the following: an input layer, a convolutional and/or pooling layer, a fully connected layer, an output layer. In an embodiment the neural network is a convolutional neural network (CNN) (although the data processing system could also (or instead) be configured to execute other types of neural network).

The Applicants have recognised that it is possible to assign portions of neural network processing to different processors of a data processing system. The Applicants have recognised that it is possible to assign portions corresponding to one or more (entire) layers of neural network. Alternatively (or additionally), parts of layers may be assigned to processors (such that a (single) layer is divided into parts which are assigned to different processors).

Hence, in an embodiment, the portions of neural network processing that can be assigned to a processor comprise one or more of: an entire layer of processing; plural entire layers of processing; and part of a layer of processing (which is less than an entire layer of processing).

Hence, in an embodiment a processor may be assigned an integer or non-integer (i.e. a fractional) number of layers for processing. For example, a processor may be assigned one or more entire layers, parts of a layer, parts of plural different layers, or one or more entire layers together with part of another layer or layers.

The number of layers (or parts of layers) which are assigned may differ between different processors. For example, a first processor may be assigned a single layer or part of a layer, while a second processor may be assigned plural layers.

In an embodiment, the data processing system is operable to perform tile-based processing of the neural network.

In embodiments using tile-based processing, a processor may be assigned a part of a layer of processing that comprises one or more "tiles" of the layer processing (but fewer tiles than the total number of tiles making up that layer).

A "tile" of a layer of neural network processing may comprise a portion of processing that is smaller than the entire layer of processing. A "tile" may comprise layer processing that is associated with a "region" or "block" of data of input data (e.g. an input data array or an input feature map) for the layer. Within a layer of processing, each "block" or "region" of the input data may be the same size (i.e. contain the same number of data points) and the same shape (configuration), for example such that each tile of processing comprises the same amount of processing. The size of the "blocks" ("regions") may be the same for all of the layers of the neural network processing. The "blocks" ("regions") are in an embodiment rectangular, and in an embodiment square.

Thus, as discussed above, in the technology described herein, neural network processing may be distributed as layers or portions of layers.

In embodiments, the distribution of neural network processing may be determined based on the processing capability of one or more (or all) of the processors which are capable of performing neural network processing.

The processing capability of a processor may comprise a compute capability, and/or a (local) storage capability of that processor. The processing capability may also comprise a data transfer capability of the processor.

The compute capability may correspond to (or be determined based on) at least one of: a rate at which a processor is capable of performing computations, an amount of computation that the processor is capable of performing within a specified period of time, a total number of computations that a processor is capable of performing at a given time (simultaneously), and a complexity of computations that a processor is capable of performing.

The storage capability of a processor may correspond to (or be determined based on) an amount (e.g. size) of (local)

storage that is associated with (or accessible to) that processor, for use when that processor is performing processing. For example, the storage capability of a processor may correspond to the size of a local buffer of the processor.

The data transfer capability of a processor may correspond to (or be determined based on) at least one of: an amount of bandwidth accessible for use by the processor, a rate at which the processor is capable of receiving or transmitting data, and a total amount of data that the processor is capable of receiving or transmitting at a given time (simultaneously).

In embodiments, the processor(s) with a greater processing capability may be assigned larger portions of the neural network processing corresponding to a larger amount of neural network processing (e.g. a larger part of a layer, more layers, or layers which will require a greater amount of processing capability). Processor(s) with a lesser processing capability may be assigned smaller portions of the neural network processing (such as a part of a layer only, or layers which will require a lesser amount of processing capability).

Hence, in an embodiment, the size of a portion of neural network processing that is to be distributed to a processor is determined based on the processing capability of that processor (e.g. on the compute, storage, or data transfer capabilities of that processor).

In an embodiment, the size of the portion of neural network processing that is distributed to a processor is determined based on the maximum processing capabilities of the processor.

Alternatively, in an embodiment, the size of the portion is based on current (or predicted) available (spare) processing capability of the processor (since the processor may be occupied with other processing tasks). In this manner, the distribution of neural network processing may be adaptively changed based on current (or predicted) available processing capability. Hence, in an embodiment, the determined distribution of neural network processing is dynamically adjusted based on available processing capability of the processors.

As mentioned above, portion(s) of the neural network processing may be distributed to one or more processors which are NNAs. Portion(s) of neural network processing may also (or instead) be distributed to one or more processors which are not dedicated NNAs (e.g. such as a CPU or GPU, or other processor).

In an embodiment, a portion of neural network processing is distributed to a processor that is not an NNA when it is determined that said processor is (or will be) idle (i.e. when said processor is not currently performing any tasks). Alternatively, a portion of neural network processing may be distributed to a processor that is not an NNA when it is determined that the processor has (or will have) spare (unused) processing capacity In this regard, the Applicants have recognised that processors such as CPUs and GPUs which are already present in a data processing system for performing functions other than neural network processing, may also be used for neural network processing when those processors are not currently occupied with executing other tasks. For example, in an embodiment, at least a portion of neural network processing is distributed to a GPU when the data processing system is not performing any graphics processing, e.g. when a user does not wish to view image or video data on an electronic device that incorporates the data processing system The Applicants have recognised that distribution of portions of neural network processing to GPU may be particularly appropriate in portable electronic devices (such as tablets or mobile phones). This is because portable electronic devices often allocate a significant area to the GPU such that the GPU has a significant compute capability. This allows the GPU to perform a significant amount of neural network processing (when it is not otherwise occupied with other graphics processing tasks).

In addition to (or instead of) distributing the portions of the neural network processing according to processing capabilities of one or more processors, in embodiments, the distributing of the neural network may (also) be based on a processing capability required to perform a particular portion (or a particular layer) of the neural network processing.

The processing capability required to perform a particular portion of the neural network processing may comprise a compute capability, and/or a (local) storage capability. The processing capability required to perform a particular portion of the neural network processing may also comprise a data transfer capability.

The required compute capability may correspond to (or be determined based on) at least one of: an amount of computation required to perform the portion of neural network processing, a rate at which (or period of time in which) the neural network processing is required to be performed, and a complexity of the computation required to perform the portion of the neural network processing.

The required storage capability may correspond to (or be determined based on) an amount (e.g. size) of (local) storage that required to store data associated with performing the portion of neural network processing, e.g. an amount storage required to store at least one of the input feature map(s), weight array(s), and output feature map(s) for the portion of neural network processing.

The required data transfer capability may correspond to (or be determined based on) at least one of: a rate at which data is required to be transferred (e.g. to a processor) in order to perform processing of the part of the neural network processing (e.g. within a specified period of time), a total amount of data that is required to be transferred in order to perform processing of the part of the neural network processing, and a bandwidth required for transferring data in order to perform processing of the part of the neural network processing. The data which is required to be transferred may comprise at least one of input feature map data, weight data, and output feature map data for the portion of neural network processing.

The Applicants have recognised that for neural network processing, the processing capability (e.g. the compute, storage or data transfer capability) required to process each layer of the neural network may be known, predictable or deterministic.

For example, the processing capability required to process a layer may be related to the size of a data array (e.g. input feature map) that the layer is configured to process, the parameters (e.g. weight map) that the layer will use to the process the data array, the number of features to be extracted from the data array when performing the layer processing, and the size of a data array (e.g. output feature map) that is to be output by the layer. These sizes may be known or predictable in advance of performing the neural network processing. For instance, for inferencing procedures, the size of the input feature map, the number of features to be extracted, and the size of the output feature map will be fixed and known, and the weight maps will generally be unchanged each time an inference is performed on a set of input data.

Generally, the size of the input feature map that is to be processed by a layer decreases for subsequent or later layers in the neural network processing due to pooling, whilst the parameters or arrays (e.g. weight map) used to process the input feature map increase in size or complexity. Hence, for initial layers of the neural network, a larger amount of buffering and larger bandwidth may be required for feature map accesses compared to weight map accesses, whereas later layers may require relatively more buffering and larger bandwidth for weight accesses. Hence, the processing capability required to process a layer may vary between layers of the neural network processing (in terms of, e.g., the compute, storage and data transfer capabilities required).

Hence, in an embodiment, the distribution of neural network processing among the processors of the data processing system is based on a determined processing capability (e.g., compute, storage or data transfer capability) that is required to process one or more (or each) of the layers of neural network.

More particularly, in an embodiment, the number of layers (or parts of layers) that are assigned to a processor is determined based on the processing capability required to process the layers (or parts of layers).

In an embodiment, the processing capability required for a layer (or part of a layer) of the neural network is determined based on at least one of: a complexity of the layer processing; a size of an input feature map that is to be processed by the layer; a size of an array of weights which is to be used when performing processing by the layer; a number of features to be extracted from the input feature map, and a size of an output feature map that is to be generated by the layer.

Hence, it will be seen that the distribution of neural network processing, in embodiments, may be based on the processing capability needed to process a layer, and also the (current or predicted) processing capabilities of the processors.

For example, in an embodiment, if a layer requires more processing capability than would be available using a single processor, then the layer of processing is distributed among plural processors. Likewise, in an embodiment, a processor may be assigned to process part of a layer which is less than an entire layer of processing if it is determined that the processor does not have sufficient capability to process the entire layer (in a timely fashion). The remaining parts of that layer may the assigned to other processors (such that the layer is distributed between multiple processors). In an embodiment, an entire layer may be assigned to a processor if it is determined that the processor has sufficient processing capacity to process that layer.

In an embodiment, a processor may be assigned plural layers to process it is determined that the processor has sufficient capability (e.g., compute, storage or data transfer capability) to process said layers. For example, a processor may be assigned to process more than one layer if the layers are not particularly complex and do not each require a large amount of processing capability to process.

With regards to compute capability, in an embodiment, a processor may be assigned a part of a layer which is less than an entire layer when it is determined that the processor cannot perform the computations required for the layer of processing at a particular (predetermined) rate or within a particular (predetermined) time period.

With regards to data transfer capability, in an embodiment, a processor may be assigned a part of a layer which is less than an entire layer when it is determined that the data (e.g. input feature map, weight, or output feature map data) cannot be transferred to or from the processor at least at a particular (predetermined) rate of if the required data cannot be transferred within a particular (predetermined) time period.

With regards to storage capability, in an embodiment, a processor may be assigned a part of a layer which is less than an entire layer when it is determined that the local storage (e.g. buffer) associated with (or accessible to) the processor is not large enough to store the data required for processing the layer, and particularly if the local storage is not large enough to store the entire input feature map for the layer. In this case, that processor may be assigned part of the layer (with the other parts of the layer being assigned to one or more other processors). In this manner each processor may only be required store (in its local storage) a part of the input data map corresponding to the part of the layer which it has been assigned.

In an embodiment, a processor may be assigned an entire layer of processing when the amount of weight data for that layer is larger than a threshold amount. In this regard, the Applicants have recognised that, even if a layer is distributed among plural processors, each processor which is assigned a part of the layer will still need to access the entire weight array (usually by storing it in its local memory). Hence, in an embodiment, if the weight array is fairly large, (only) a single processor is used to process the layer, so that the weight array only needs to be accessed by (and loaded into the local memory of) a single processor.

The Applicants have also recognised that different processors (e.g. CPUs, GPUs, and differently configured NNAs) may be better suited (or optimised) for performing different portion of the neural network processing (e.g. different layers or layer types). For example, a processor which is better suited (or optimised) to perform a certain portion of neural network processing may be capable of processing that portion more efficiently or faster than other processors of the data processing system.

Hence, in embodiments, the distribution of the neural network processing takes account of the suitability of the processors for performing processing of particular layers or types of layer. Hence, in an embodiment, a processor may be preferentially assigned certain portion(s) of the neural network processing. For example, in an embodiment, certain processor(s) are preferentially assigned portions of the neural network processing corresponding to earlier layer(s) (e.g. input layer(s), or initial convolutional and/or pooling layers), whilst other processors may be preferentially assigned portions of the neural network processing corresponding to later layer(s) (e.g. later convolutional and/or pooling layers, or fully connected layers, or output layer(s)).

The (initial) determination of whether to process the neural network using a single processor or plural processors is also in an embodiment based on the processing capability needed to process the neural network and/or (and in an embodiment and) the (current or predicted) processing capabilities of at least one of the processors.

In an embodiment, it may be determined that a single processor should be used if the neural network processing can adequately be performed by the single processor (e.g. if the single processor has sufficient processing capability to perform the neural network processing at a desired rate, or within a desired time period). The single processor in question may be a neural network accelerator (NNA).

It may also (or instead) be determined to use a single processor (e.g. NNA) for the neural network processing if the other processors of the system are not currently available (or will not be available) to process portions of the neural network (e.g. if the other processors are performing other tasks).

The data processing system of the technology described herein is operable, when neural network processing is to be performed, to determine a distribution of the neural network processing among one or more processors. The determination may, and in an embodiment does, take account of the criteria discussed above (e.g. the processing capabilities of the processors, and amount of processing required to process layers of the neural network).

The determination and distribution of the neural network processing among the one or more processors may be done in any suitable and desired manner and by any suitable and desired component or element of the data processing system. In an embodiment a controlling processor, such as a CPU (e.g. host processor), of the data processing system does this and, e.g., includes appropriate control circuitry (circuit) for this purpose (and that, e.g. in an embodiment has access to or knowledge of data relating to the criteria which will be used for the determination). In an embodiment the determination and distribution is performed by an appropriate software control layer (module) executing on the controlling processor, e.g. CPU.

The control circuit/layer (module) may be configured to determine a distribution of neural network processing in response to receiving a request for the data processing system to perform neural network processing. The request may be received from any suitable component of the data processing system (or from a component of an electronic device on which the data processing system is implemented). For example, the request may be received from a software application executing on the controlling processor, e.g. CPU.

The control circuit/layer may be operable to interact directly with the processors that are operable to perform neural network processing, and to inform the processors of the portions of neural network processing which they have been assigned.

Alternatively (and in an embodiment), the control circuit/layer interacts with the appropriate drivers for those processors that are operable to perform neural network processing. In this manner, the control circuit/layer may be configured to determine the distribution of the neural network processing and to pass information regarding the distribution to drivers for the processors, e.g. to instruct the processors to perform the processing which they have been assigned.

If part of the neural network processing has been assigned to the CPU for processing, then the control circuit/layer may control or instruct the operation of the CPU itself. A portion of the neural network processing may be executed on the CPU using CPU code which is configured for use when performing neural network processing. This CPU code may be stored in (or as part of) a compute library, which may be called by the control circuit/layer.

As discussed above, the Applicants have recognised that it is possible to distribute neural network processing amount plural processors. The neural network distribution may be determined based on the processing capability required to process portions of the neural network and/or based on the available processing capabilities of the processors.

In an embodiment, the determination of the distribution of the neural network also takes account of (and is based on) the amount of time that one or more of, and in an embodiment each of, the processors will take to complete a (its) portion of the neural network processing.

In this regard, the Applicants have recognised that the data processing system may be operated to synchronise the timing of the processing performed by the processors, e.g. to avoid stalls and reduce the amount of time that processors are idle for.

Hence, in an embodiment, the neural network processing is distributed such that the processing by the plural processors is synchronised. In an embodiment, the neural network processing is distributed and controlled such that plural (and in an embodiment all) of the processors complete their assigned portion of the neural network processing at approximately the same time. ("Approximately the same amount of time" may refer to the range of times taken (required) by the processors differing by less than a threshold amount.)

For example, the distribution of neural network processing may be such that a (single) layer is distributed among plural processors which are each assigned a part of the layer to process. In such an example, each of the processors may produce output data for the layer (e.g. producing part of an output feature map for the layer). The final output (e.g. output feature map) for the layer will be complete once all of the processors have completed processing their parts of the layer. It may be desirable for each of the processors processing the layer to complete their processing at approximately the same time. This may reduce the likelihood of stalls occurring when a subsequent layer requires the final output (e.g. output feature map) as an input for the subsequent layer processing.

In another example, the distribution of neural network processing may be such that different layers are assigned to different processors. In such an embodiment, the different layers may be processed in sequence such that the output from one layer of processing performed by a processor is used as an input by a next processor for a next layer of processing (i.e. a "pipelined" arrangement). Once a processor has completed its assigned layer of processing, it will be free to perform other processing. Hence, the data processing system can be used to perform neural network processing for plural input data arrays (e.g. plural image frames) simultaneously, such that a processor may begin layer processing for a next input data array (e.g. from a next frame of video data) once it has completed layer processing for a previous input data array (e.g. previous frame of video data). In this case it may, again, be desirable for each processor to complete its assigned portion (layer) of processing at approximately the same time, so that each of the processors can begin processing a next input data array at the same time. This may reduce the amount of time that processors remain idle for.

The Applicants have recognised that an option for synchronising the processors is to, when determining the distribution of neural network processing, account for the amount of time that a processor will take to process a portion of the neural network processing. Alternatively (or additionally) the operation of the processors may be modified (or controlled) to modify (or control) the time which the processor will take to process a portion of neural network processing.

Hence, in an embodiment, when determining the distribution of neural network processing, the amount of time that a processor will take to process a portion of the neural network (e.g., when operating at a particular, in an embodiment selected, processing rate) is also determined. The operating rate of the processor may correspond to the maximum possible operating rate (or clock frequency) of the processor, or a proportion of the maximum operating rate (or clock frequency), e.g. depending on the usual rate for processing by the processor.

In an embodiment, determination of the distribution of neural network processing takes account of the time that a processor will take (require) to process a portion of neural network processing. In an embodiment the processors are assigned respective portions of neural network processing such that each of processors will take (require) approximately the same amount of time to process its assigned portion.

Hence, in an embodiment, the neural network processing is distributed such that each processor will take an amount of time to complete its assigned processing that does not differ by more than a particular, in an embodiment selected, in an embodiment predetermined, margin from the time taken by the other processors. In an embodiment, the neural network processing is distributed among plural processors such that the difference in time required by a processor and another (or any other) processor to perform their respective assigned portions of the neural network processing is less than a particular, in an embodiment selected, in an embodiment predetermined, amount of time.

In an embodiment, the neural network processing is distributed such that the difference between the shortest amount of time taken by a processor to perform its assigned processing and the longest amount of time taken by a (different) processor to perform its assigned processing is less than a particular, in an embodiment selected, in an embodiment predetermined, amount.

Although the distribution of neural network processing may be performed such that the processors complete their processing in approximately the same amount of time, it may not always be possible to divide up the processing so that amount of time taken is exactly the same. For example, there may be a limit on the smallest portion size that can be assigned (e.g. corresponding to a single "tile" of a layer).

Hence, in an embodiment, determining a distribution of the neural network processing may comprises determining whether to modify (or control) the operation of a processor to modify (or control) the amount of time that the processor will take to perform a portion of the neural network processing. In an embodiment, the operation of one or more processors may be modified (or controlled) to ensure that the processors complete their processing in approximately the same time. Such modification (or control) may be useful in situations where the processors would otherwise not complete their assigned portions within approximately the same amount of time (when operating under normal un-modified conditions). The operation of the processors may be modified in any suitable manner.

In an embodiment, the operation of one or more processors is modified by modifying the rate at which the processor performs processing. In an embodiment, modifying the rate comprises reducing the clock frequency at which the processor operates. Reducing the clock frequency allows a lower voltage to be supplied to that processor, and therefore also consumes less power. This reduction in power is particularly useful in low power and portable electronic devices.

The operation of the processors may be modified (or controlled) in another manner, such as e.g., offsetting a starting time for processing for one or more processors.

Hence, in an embodiment, it is determined whether or not is it possible to distribute the neural network processing such that the processors each take (require) approximately the same amount of time to process a portion of the neural network processing.

In an embodiment, if it is determined that it is not possible to distribute the neural network processing such that the processors each take (require) approximately the same amount of time, then an indication is provided that at least one of the processors should operate at a modified (e.g. reduced) processing rate.

As noted previously, in the technology described herein the neural network processing may be performed by a single processor, or may be (and in an embodiment is) performed by plural processors. The overall result (i.e. the final output, such as the classification of an object within an image), should be the same regardless of whether a single processor or multiple processors are used.

Hence when using plural processors, the neural network processing should be, and is in an embodiment, distributed such that all of the required neural network processing is distributed among the processors. Correspondingly, the neural network processing should be, and is in an embodiment, distributed such that the final output from the processing of neural network portions by the plural processors is the same as a final output that would be derived using a single processor performing the entire neural network processing.

In the technology described herein, performing the neural network processing comprises each of the processors performing neural network processing according to the portion of the neural network processing which it has been assigned, to thereby provide a (final) neural network processing output.

The final output for the neural network processing may be produced in any suitable and desired manner, based on the processing performed by the processors to which the neural network processing has been assigned.

For instance, the final output for the neural network processing may result from performing layers of the neural network processing by the processors to which they have been assigned. The layers of processing may be performed in sequence (one after the other), such that an output from a layer of processing is used as an input for a subsequent layer of processing.

In the case that a processor is assigned an entire layer to process, the processor may access input data (e.g. an (entire) input feature map) needed to perform the layer of processing, and may generate corresponding layer output data (e.g. an (entire) output feature map) when performing the layer of processing. The layer output data may be made accessible to subsequent processor(s) that have been assigned a subsequent layer to process.

In the case that plural processors have been assigned part of a (single) layer of processing (such that the layer is distributed among the plural processors), each of the processors may access input data needed to perform the part of the layer of processing to which they have been assigned. For example, each of the processors may access part of an input data array (e.g. input feature map). Each of the processors may generate output data (e.g. a corresponding part of an output feature map) when performing the part of the layer of processing to which they have been assigned. The output data generated by the plural processors may be combined to produce (overall) layer output data. Again, the layer output data may be made accessible to subsequent processor(s) that have been assigned a subsequent later to process.

Alternatively, if the processor(s) are assigned to process (all of or part of) a final layer of neural network processing (such that there are no further subsequent layers of processing to be performed), then the layer output data may comprise a final output for the neural network processing.

The final neural network processing output may output may be output in any suitable manner. In an embodiment, the data processing system comprises output circuitry operable to output data corresponding to the (final) neural network processing output. The output circuitry may be operable to send the output data to storage, or to send the output data to another component of the data processing system (e.g. to a processor for further processing).

When a processor is performing the processing to which it has been assigned, the processor may process the required input data using parameter data (such as a weight array, for example) to produce output data. Generally, regardless of whether a processor is processing an entire layer or only part of a layer, the processor will need to access the entire weight array for a layer. Hence, when a layer is distributed among plural processors, plural processors will require access to the same weight array for the layer.

Hence, in the technology described herein where neural network processing is distributed between plural processors, various data (such as input data, output data, and weight data) may need to be accessed by processors or passed between processors. It may also be the case that plural processors require access to the same data.

The Applicants have recognised that it may be useful to control the flow of data to try to improve the transfer of data (such as input data arrays, output data arrays and weight maps) to and from the processors, and thereby improve the efficiency with which the neural network can be processed.

For example, the Applicants have recognised that, when neural network processing is divided among plural processors, it may be the case that at least some of the processors require the data from main (external) memory for performing their assigned portions of neural network processing. The Applicants have recognised that if plural processors were each to request data from main (external) memory at the same time, this could cause the data processing system to be overburdened with memory read and write requests.

Furthermore, when the neural network processing is divided among plural processors, some of the processors may require the same data from external memory. For example, if a layer of neural network processing is divided among multiple processors, those processors may each require the same parameter (weight) data in order to process their respective parts of the layer. Since the parameter (weight) data may comprise a large amount of data, it may be stored in a main (external) memory of the data processing system rather than a local memory. If the processors requiring the same data were each to request that same parameter data from main (external) memory at the same time, this could also cause problems.

The Applicants have recognised that, whilst it would be possible for each of the processors processing part of a layer to individually request parameter (weight) data for the layer from a memory of the data processing system, this can cause the system to become overburdened with data requests and overburdened with the memory transactions which are required fetch weight data from the (local and/or external) memory. This may be particularly problematic if the processors are completing their work in approximately the same time, and therefore would be ready to send requests for data at approximately the same time. This may cause delays or stalls, particularly since a large amount of parameter (weight) data is often required for layer processing in neural networks.

The Applicants have recognised that it may be possible to improve system performance, and reduce the burden associated with data requests from memory when processing a neural network on multiple processors.

The Applicants have recognised in this regard that the burden associated with data requests (e.g. weight requests) may be reduced by offsetting data requests in time (e.g., so that the requests from different processors do not significantly overlap).

Alternatively, the burden associated with (weight) data requests may be reduced by reducing the number of (weight) data requests that are made. For example, the processors may be controlled such that a single processor requests (weight) data, and the returning (weight) data is then made available to all processors that require it. The weight data may be made available, for example, by broadcasting or sending the weight data to the processors, or by writing the weight data to storage which is shared by the processors.

Hence, in an embodiment, the data processing system is configured to, if plural processors require data from main memory in order to perform their respective assigned portions of neural network processing, control the operation of those processors such that data requests from those processors are offset in time.

Hence, the data processing system may be configured to offset data requests for processors that require (any) data from main memory. Alternatively, the data processing system may be configured to offset data requests (only) when plural processors will require the same data from main memory, e.g. when plural processors will require the same parameter (weight) data from main memory.

In an embodiment, the data processing system may be configured to control the operation of processors which require (e.g. the same) data from main memory such that those processors will require data at different times. Hence, in an embodiment, those processors may be controlled such that those processors send data requests for the data at different (offset) times.

In an embodiment, the data processing system is configured to offset (e.g. modify the timing of) data requests such that the amount of overlap in time between the requests (e.g. for the same data) is less than when the data processing system is not configured to offset the data requests. For example, the data processing system may be configured to offset data requests such that the number of data requests (e.g. for the same data) occurring substantially simultaneously is less than when the data processing system is not configured to offset the data requests.

The offsetting in time of the data requests (e.g. for the same data) may be implemented by the data processing system offsetting a time at which each processor (requiring the same data) starts processing its assigned portion of the neural network processing, such that the processors will require data at different times. The data processing system may also or instead be operable to adjust (e.g. reduce) the processing rate (clock frequency) of one or more of the processors (e.g. which require the same data) such that different processors will take different amounts of time to complete their assigned work (processing). Other means to ensure that the processors requiring (e.g. the same) data from memory are not synchronised in time may also or instead be used, if desired.

In another embodiment, when the neural network distribution is such that multiple processors require the same (parameter) data to perform their assigned portions of neural network processing, those processors requiring the same (parameter) data are controlled such that only one of the processors is operable to request (parameter) data from memory (e.g. from main memory) (with the other processors which require the same (parameter) data not requesting the (parameter) data from memory). Hence, in embodiments, only a single processor will request (parameter) data from memory, even if multiple processors will require that data for processing performing their assigned portions of neural network processing. This will then reduce the number of requests which are sent to memory.

In one embodiment a single processor sends a request to the memory for (parameter) data, and the data that is returned from memory is made available to (all of) the processors that require the same data for performing their assigned portions of neural network processing.

The (parameter) data that is returned from memory may be made available by sending the data to each of the processors that require the data. In this embodiment, the operation of the processors requiring the same (parameter) data is in an embodiment synchronised such that each of the processors will require the (parameter) data at approximately the same time.

Each of the processors requiring the (parameter) may have an associated local storage (e.g. buffer or cache) for use when performing neural network processing. The (parameter) data may be sent to the processors by fetching the data from memory and then storing the data in the local memory (buffer) of each of the processors requiring the same (parameter) data. Such embodiments may be particularly useful as they can be implemented without necessarily having to provide any direct interconnects between the processors, or substantially modify the interconnect topology within the data processing system. It also does not require additional shared memory that is accessible by plural processors.

Alternatively, instead of sending the (parameter) data to each of the processors which require the same (parameter) data, the (parameter) data may be sent (written) to a (shared) storage which is accessible by each of the processors that require the same (parameter) data (and in embodiments, this is done). In such embodiments, each processor is operable to read data from the storage (to which the data has been sent) and, e.g., to place that data into its associated local memory (e.g. buffer) as and when it requires that data for performing neural network processing. The processors may be stalled until the data is available within the storage.

The stalling of the processors may be performed as follows. In a first embodiment, each of the processors may submit requests for data from the shared storage until the data is available in the shared storage. Once data is available in the shared storage, the data will be returned to the processors, and no further requests need to be submitted.

In a second embodiment, only a single processor may submit a request to read data from the shared storage. If the request from that single processor results in a miss, then the shared storage may request the data from main memory. The other processors may also request (the same) data from the shared storage, but if these requests result in misses then this will not trigger the shared storage to fetch data from memory. This could be implemented by the single processor being configured to generate a large number of (read/write) transactions, for example, up to 32 simultaneous, transactions. However, the other processors will be programmed/configured to perform only a handful of transactions, for example up to 2 simultaneous transactions. These other processors will wait for data to be returned before submitting further transactions. This avoids all of the processors performing lots of requests which would cause power to be wasted.

The shared storage that is accessible to processors which require the same (parameter) data may comprise a shared buffer (e.g. an L2 cache). Hence, in an embodiment, after a single processor sends a request to the (main) memory for (parameter) data, the data that is returned from memory is fetched to (and stored in) a shared buffer (e.g. an L2 cache) which is accessible by each of the processors which require that same (parameter) data, such that each of the processors may read data from the shared storage and place that data into their respective associated local storage (e.g. buffer).

Alternatively, the shared storage that is accessible to processors which require the same (parameter) data may comprise local storage (e.g. a buffer) associated with a (particular) processor of the data processing system. Hence, in an embodiment, after a single processor sends a request to the (main) memory for parameter (weight) data, the data that is returned from memory is fetched to (and stored in) a (one) local storage (e.g. buffer) associated with a (one) processor of the data processing system. In an embodiment the processor which the local storage (buffer) is associated with is one of the processors that require the (parameter) data.

In an embodiment, the processor which the local storage (buffer) is associated with the single processor which requested the data. The (other) processors which require the (parameter) data should then be operable to access the data that is stored in the local storage of the processor in question. For example, the processors may be connected (e.g. via a direct interface) to the local storage of the processor in question, such that the processors may read data from the local storage of the processor in question and place the data into their own respective associated local storage (e.g. buffer).

In the above embodiments, the processors which require the same (parameter) data may comprise processors which are assigned different parts of a same layer of neural network processing. The (parameter) data may therefore comprise weight data for processing the layer which is divided among those processors. Hence, the above embodiments may be applicable if the distribution of neural network processing is such that plural processors are assigned different portions of the same layer.

However, although the data which is required by plural processors assigned portions of the neural network processing may comprise parameter (e.g. weight data) which is stored in memory, the data could also or instead comprise other data which is stored in memory, such as e.g., input feature maps.

The above embodiments can provide improvements to neural network processing when multiple processors require the same data which is stored in main memory (e.g. such as weight data required by multiple processors that are assigned to process different parts of a same layer).

Generally, requesting data from main memory is a slow process. The Applicants have recognised that there may be situations where it is possible to share or pass data between processors (rather than having to write data to main memory, and then read it back from main memory when it is required for subsequent neural network processing). This may allow the neural network processing to be performed more efficiently, with less latency and also with fewer read/write requests to main memory.

In this regard, the Applicants have recognised that output data generated when performing a portion of neural network processing (by one or more processors) may be required as input data for another portion of neural network processing (to be performed by one or more processors). For example, output data (e.g. an output feature map) from one layer of neural network processing may be required as an input data (e.g. an input feature map) for a subsequent (next) layer of processing.

The Applicants have recognised that in such situations, it is possible to send data directly from the processor(s) that are generating the output data to the processor(s) which require the generated data as input data (instead of, for example, having to write the output data to main memory, and then read the data back from main memory when it is required for subsequent processing).

Hence, in an embodiment, data may be passed between processors which are assigned portions of the neural network processing without that data being sent to (main, external) memory.

In an embodiment, data that is generated by a processor when performing a portion of neural network processing is sent to another processor that will require the generated data as input data for performing its assigned portion of neural network processing.

In an embodiment the data from a single processor performing an entire layer of neural network processing is sent to another processor that has been assigned a subsequent entire layer of neural network processing (without being written to main, external memory).

However, in other embodiments, data may be sent from a single or plural processors which are performing neural network processing to single or plural processors which require that data as input data in order to perform the neural network processing which they have been assigned (without the data being written to main memory). For example, output data generated by a single (or plural processors) that are processing an entire (or part of a) layer may be sent to a single (or plural) processors that are assigned to process an entire (or part of a) subsequent layer of processing.

The data generated by a processor may be sent to those processors which require the generated data as input data for performing their assigned neural network processing. A processor which requires data that is generated by another processor may (only) be able to obtain (e.g. access or receive) the data which it requires.

This passing of data between processors that are processing consecutive layers may be referred to as "pipelining" of the processing. Passing data between processors in this manner may reduce latency within the system since it is then not always necessary to write output data to or read input data from main (external) memory.

In an embodiment, output data generated by a processor when performing its assigned portion of neural network processing is sent to (passed to) a processor that will require the data for performing its assigned neural network processing via a direct interface. The direct interface may be such that the output data is transmitted directly between the processors (e.g. without being stored in any storage between the processors).

Alternatively, (instead of a direct interface), data may be transferred between processors via storage (e.g. such that the data is written to storage by the processor(s) that generate the data, and is subsequently read from storage by the processor(s) that require the data). The storage is accessible to at least some of the processors between which the data is to be transferred. The storage may comprise a storage that is associated with a processor that will require the data (e.g. a local buffer of cache for the processor that will require the data). Alternatively, the storage accessible to the processors may comprise a shared storage (which is not associated with a particular individual processor). The shared storage may comprise a local, on-chip storage, e.g. shared buffer or L2 cache.

Hence, in embodiments, data may be exchanged (transferred) between processors. The data may be transferred directly between the processors (e.g. via a direct interface), or the data may be transferred between processors via a storage (e.g. a local, on-chip storage, such as shared buffer which is accessible to plural processors). The processors (and storage, if used) may exchange signals as a "handshake" to control data transfer.

In an embodiment, a processor (or storage) may indicate when it is ready to send and/or receive data.

A "valid" signal may be generated when a processor (or storage) is ready to send data (e.g. to another processor or to a storage location). For example, a "valid" signal may be generated in response to (or triggered) by the processor generating data when performing its assigned neural network processing.

A "ready" signal may be generated when a processor (or storage) is ready to receive data (e.g. from another processor, or from a storage location). For example, a "ready" signal may be generated in response to (or triggered by) the processor commencing its assigned neural network processing, or in response to (or triggered by) a processor reaching a predetermined point in its assigned neural network processing, or in response to a local storage (e.g. buffer) associated with a processor having spare storage capacity.

The "valid" signals and "ready" signals may be exchanged in any suitable or appropriate manner. The "valid" and "ready" signalled may be generated by any suitable component of the data processing system.

The term "signal" used herein may refer to any suitable indication within the data processing system (such as, e.g., a value written to a suitable storage, e.g. register).

In an embodiment, if a processor (or storage) is not ready to receive data, then a signal may be generated indicating that further data cannot be accepted by the processor (or storage), for example by setting the ready signal to a predetermined state, such as a low state (e.g. 0). If the data is to be received from a (previous) processor, then in response to the generation of the signal indicating that further data cannot be accepted, the data processing system may slow down, or in an embodiment stop ("gate"), the clock of the (previous) processor. This will prevent the (previous) processor from overrunning. Once the processor (or storage) is ready to receive data from the (previous) processor, a "ready" signal may be generated, for example by setting the ready signal to a (different) predetermined state, such as a high state (e.g. 1).

The data processing system may comprise and/or be in communication with one or more memories (such as the memories described above) that store the data described herein, and/or store software for performing the processes described herein. The data processing system may be in communication with a host microprocessor, and/or with a display for displaying output data associated with the neural network processing.

The data processing system of the technology described herein may be implemented as part of any suitable system, such as a suitably configured micro-processor based system. In some embodiments, the technology described herein is implemented in a computer and/or micro-processor based system. The data processing system may be a microprocessor, a programmable FPGA (Field Programmable Gate Array), etc.

The various functions of the technology described herein may be carried out in any desired and suitable manner. For example, the functions of the technology described herein may be implemented in hardware or software, as desired. Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing circuitries may share processing circuitry, etc., if desired.

It will also be appreciated by those skilled in the art that all of the described embodiments of the technology described herein may include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system.

The technology described herein also extends to a computer software carrier comprising such software which when used to operate a data processing system causes in a processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 shows a data processing system 10 which may be used to perform neural network processing. The data processing system comprises an image sensor 1 which may be operable to provide image data to an image signal processor 2. The image signal processor 2 may process the image data to provide data that is suitable for use as input data for neural network processing. The data processing system also comprises a CPU 3, GPU 4 and a NNA (neural network accelerator or processor) 5.

The CPU 3 may be operable to control the components of the data processing system 10, for example by issuing appropriate commands. The GPU 4 may be operable to perform graphics processing. The NNA may be a processor which is specifically configured or optimised to perform neural network processing, such as performing identification or classification of objects within images that are provided by the image sensor 1, ISP 2 or GPU 5.

The data processing system comprises an interconnect 6 which provides an interface between the various processors (ISP, CPU, GPU and NNA) and a memory controller 7. The memory controller 7 is operable to manage memory read and write requests, and to control reading and writing of data to off-chip memory 8.

The ISP 2, CPU 3, GPU 4, NNA 5, interconnect 6 and memory controller 7, may be provided as part of a system-on-chip 9. The image sensor 1 may be located off-chip. The off-chip memory 8 may comprise a main memory which is external to the system-on-chip.

Although the NNA 5 may be specifically configured for performing neural network processing, other processors of the data processing system (such as the ISP, CPU and GPU) could also be used to perform at least a portion of any required neural network processing.

Although an image sensor 1 is shown in FIG. 1 for providing input data in the form of image data, other sensors or input devices could be incorporated within the data processing system, such as for example, a sound sensor.

Figure 2:
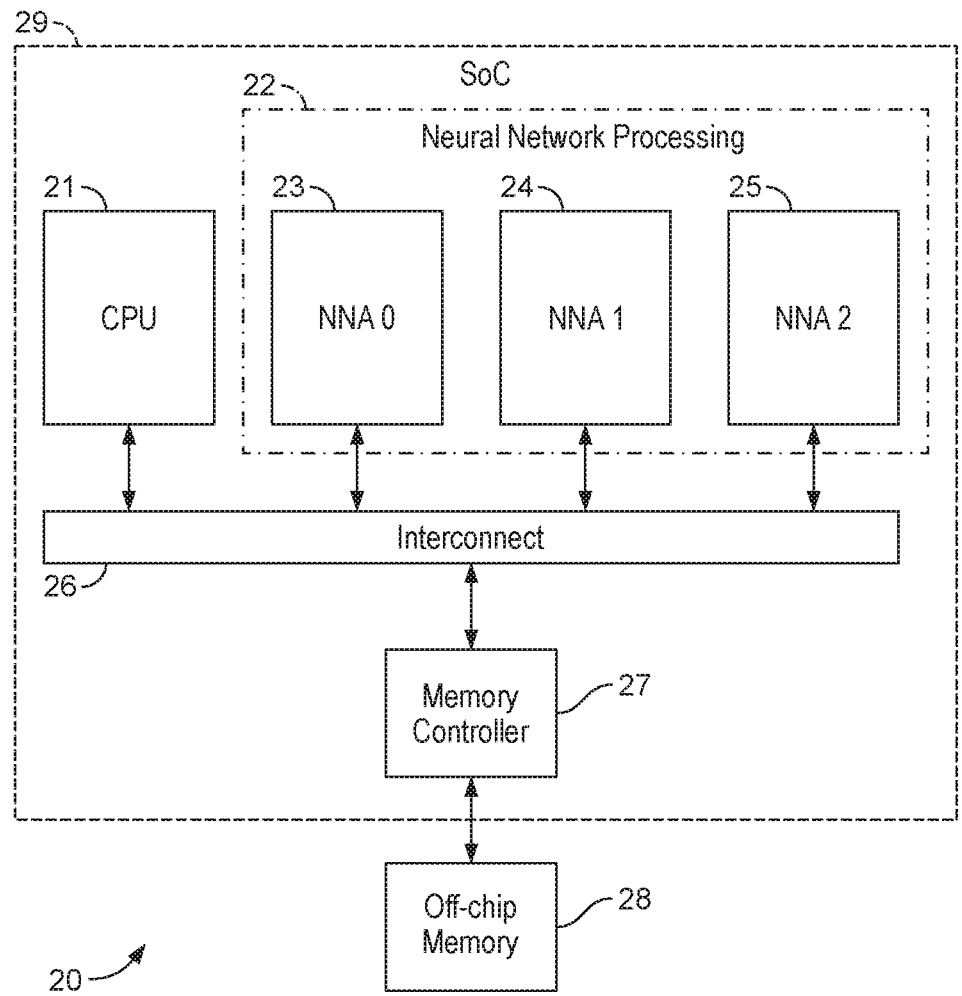
FIG. 2 shows a homogenous data processing system which may be operable to perform neural network processing.

FIG. 2 shows a data processing system 20 which may be used to perform neural network processing. Similarly to the system of FIG. 1, the system of FIG. 2 contains various processors (such as CPU 21, and NNAs 23, 24 and 25), an interconnect 27 and a memory controller 27 arranged within a system-on-chip 29. The system 20 also comprises off-chip memory 28.

In particular, FIG. 2 shows a system which may be operable to perform neural network processing using plural neural network processors (NNAs 23, 24 and 25) by distributing the neural network processing among the NNAs. The NNAs may be part of a neural network processing unit 22. Such a system may be termed a "homogenous" system, since all of the processors that process the neural network are of the same type (being NNAs).

The neural network processing may be distributed among the NNAs according to the processing capabilities of the NNAs, and according to the amount of processing required to perform various portions (e.g. layers) of the neural network processing, as described herein.

Figure 3:
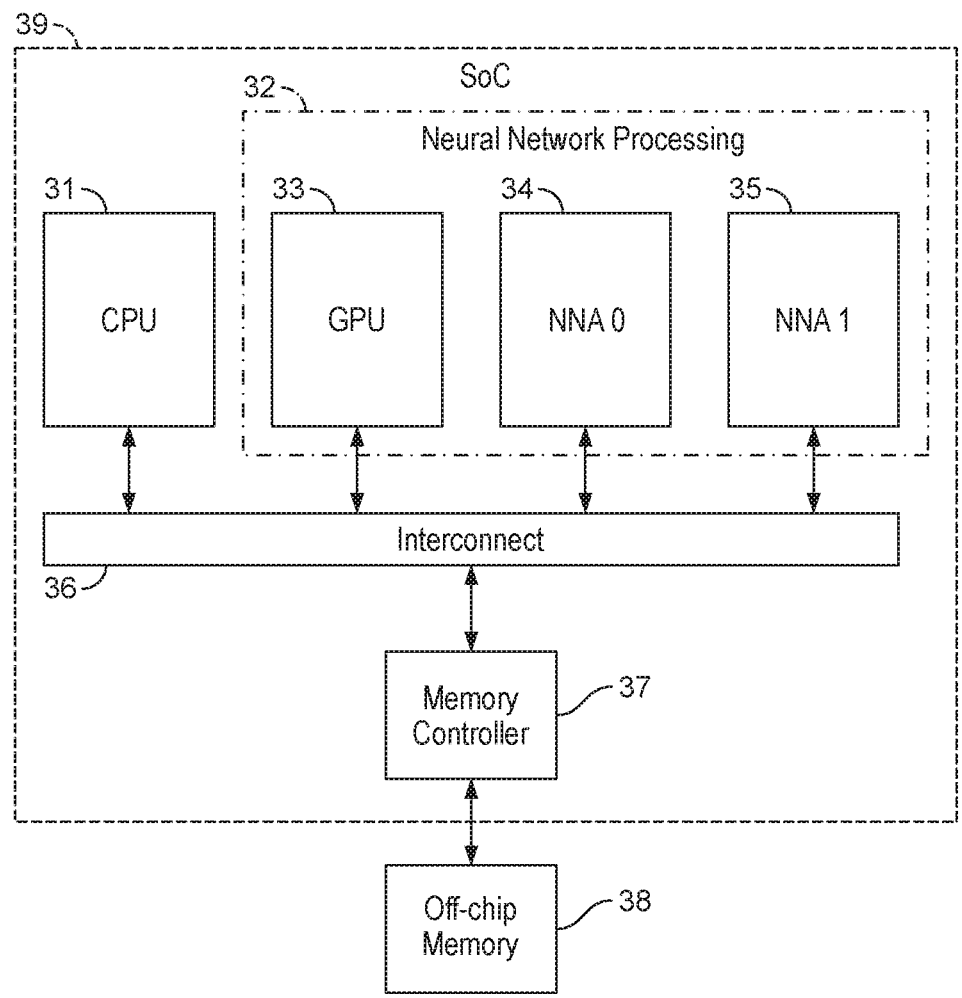
FIG. 3 shows a heterogeneous data processing system which may be operable to perform neural network processing.

FIG. 3 shows a data processing system 30 which is similar to that shown in FIG. 2, having a system-on-chip 39 comprising a CPU, a neural network processing unit 32, an interconnect 36, and a memory controller 37, and also comprising an off-chip memory 38.

The system 30 of FIG. 3 differs in that it is a "heterogeneous" system that is operable to perform neural network processing using plural different types of processors. Hence, the neural network processing unit 32 comprises a GPU 33, and NNAs 34 and 35.

The neural network processing may be distributed among the processors according to the processing capabilities of the processors, and according to the amount of processing required to perform various portions (e.g. layers) of the neural network processing, as described herein. For example, the neural processing may be performed primarily on the NNAs 34 and 35, and portions of neural network processing may be assigned to the GPU 33 when it is determined that the GPU 33 is idle or has spare processing capability.

As described previously, in response to a request to perform neural network processing, the data processing system of the technology described herein may determine a distribution of the neural network processing among plural processors which are operable to perform neural network processing, and to perform the neural network processing according to the distribution.

Figure 4:
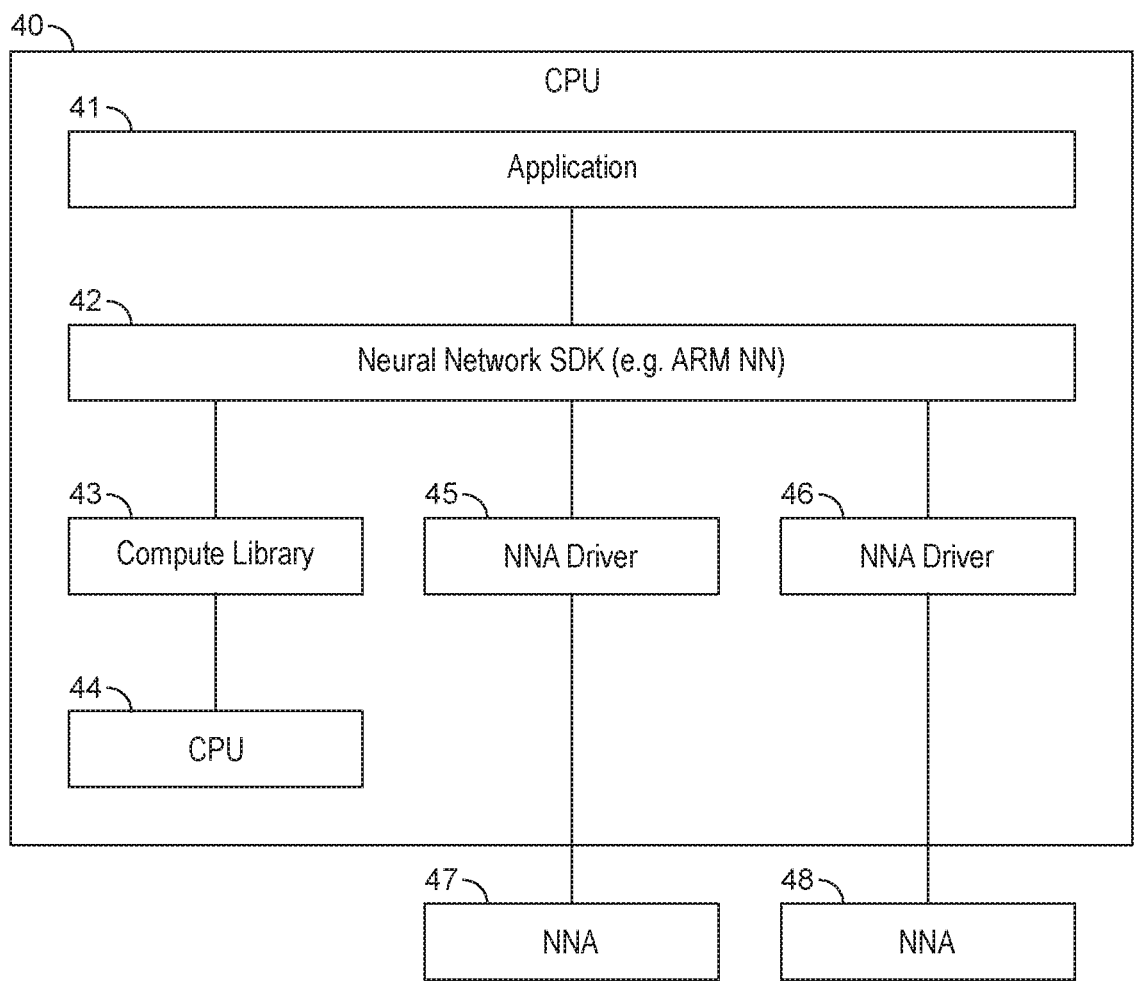
FIG. 4 shows elements, such as drivers and software, which may be operable to distribute neural network processing among plural processors.

FIG. 4 shows schematically components of the data processing system which may be used for the determination of the distribution, and for the execution of the neural network processing.

In the embodiment shown in FIG. 4, an application 41 executing on a CPU 40 of the data processing system may require neural network processing to be performed. The application 41 is operable to interact with a control layer 42 (which is shown as a software layer which executes on the CPU 40). The application may send a request to the control layer 42 requesting that neural network processing is to be performed. Sending the request may include sending instructions for performing the neural network processing to the control layer 42.

The control layer 42 is operable to, in response to receiving a request for performing neural network processing, determine a distribution of the neural network processing among processors 44, 47, 48 of the data processing system. Determining the distribution may take account of the processing capabilities required for performing the neural network processing, and the available processing capabilities of the processors 44, 47, 48 of the data processing system. Information regarding the available processing capabilities of the processors 47, 48 may be communicated to the control layer 42 by drivers 45, 46 associated with the processors.

Once the control layer has determined a neural network distribution, instead of having to instruct the processors directly to perform the neural network processing, the control layer 42 may interact with the processors through intermediate elements (such as the compute library 43, or drivers 45, 46 shown in FIG. 4). The control layer may be operable to pass information regarding the determined neural network distribution to the intermediate components 43, 45, 46.

Each of the intermediate components 43, 45, 46 is associated with a respective processor (CPU 44, and NNAs 47, 48).

For example, when a portion of neural network processing is to be performed using a CPU 44, the neural network processing may be performed using CPU code which is specifically configured for performing neural network processing. This CPU code may be stored in (or indicated in or generated by) the compute library 43. The control layer 42 may be operable to select (or otherwise use) code from the compute library 43 for performing the neural network processing on the CPU 44. If there are multiple CPUs, the compute library 43 may be used to generate CPU code which can be executed on a different CPU.

The intermediate components associated with the NNAs 45, 46 are drivers 45, and 46.

Each intermediate component 43, 45, 46 is operable to interact with its associated processor 44, 47, 48, to instruct the processor to perform a part of the neural network processing that is has been assigned (according to the determined neural network processing distribution).

In this manner, the control layer 42 can be configured specifically for performing the determination of the neural network distribution, whilst the intermediate components 43, 45, 46 can be configured specifically to interface with the processors that are going to perform the neural network processing.

Although FIG. 4 shows an application 41 executing on the CPU being operable to send neural network processing requests to the control layer 42, in other embodiments, other processing elements (e.g. such as other processors of the data processing system, or other processors of an electronic device incorporating the data processing system) may also be operable to send neural network processing requests to the control layer 42.

Although FIG. 4 shows the control layer 42 as a software layer executing on the CPU 40, in other embodiments the control layer could be executed on a processor other than the CPU.

Figure 5A:
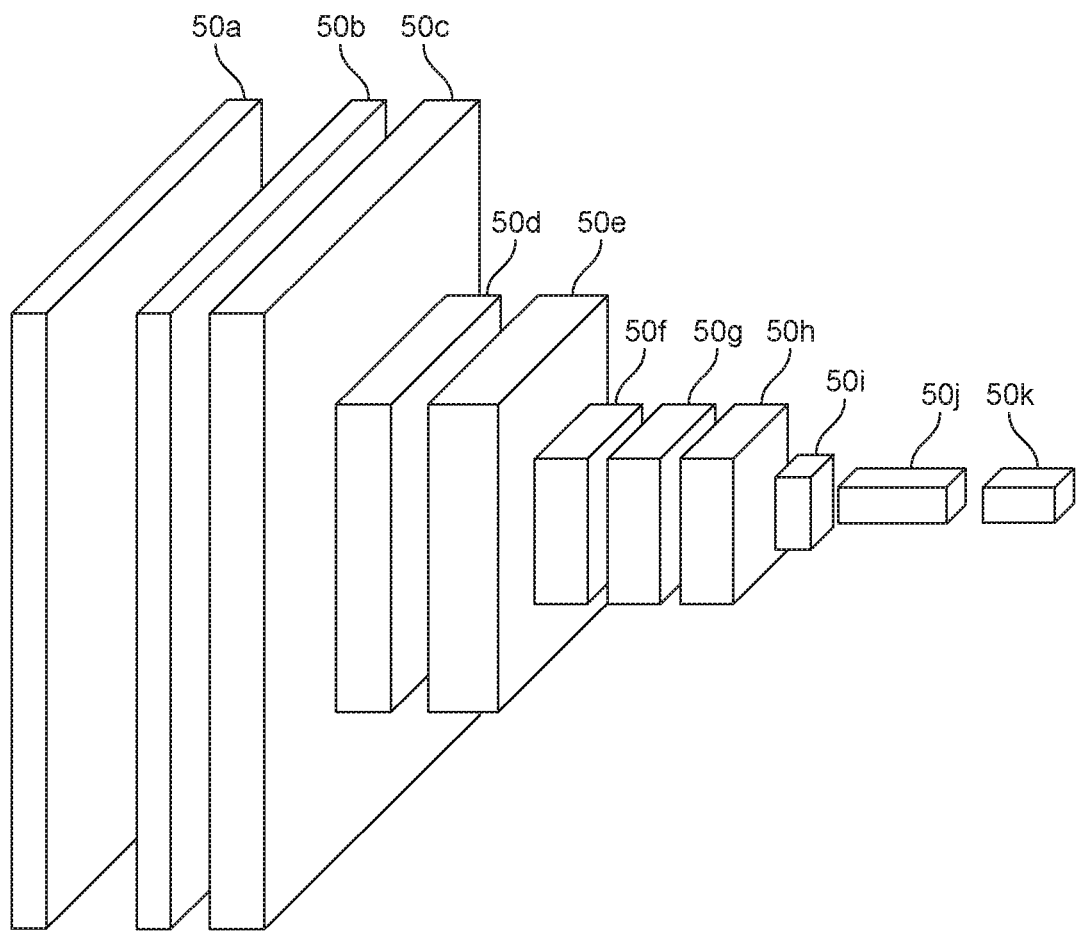
FIG. 5A shows a number of layers of neural network processing.

FIG. 5A illustrates a neural network 50 which may be processed by the data processing system disclosed herein. The neural network processed by the data processing system disclosed herein may be any suitable type of neural network. In the present embodiments, the neural network is a convolutional neural network (CNN), which is the type of neural network shown in FIG. 5. The CNN comprises a number of layers 50a-50k which operate one after the other, such that the output data from one layer is used as the input data for a next layer.

The CNN shown in FIG. 5A comprises an input layer 51. The input layer receives an input data array (e.g. comprising data corresponding to image or sound data), and passes that data array on to the next layer of the neural network.

The layers (50b-50i) shown in FIG. 5A are convolutional and/or pooling layers.

A first layer 50b may comprise a convolutional layer. The convolutional layer may receive data generated by the input layer 50a for use as input data. The first convolutional layer may generate output data comprising an output feature map. The output feature map may comprise a representation of features that were present in the data array that was received by the convolutional layer. The output feature map may be used as the input data (i.e. as an input feature map) for a subsequent layer of neural network processing.

For example, a pooling layer 50c may be provided after a convolutional layer. The pooling (or "downsampling") layer may operate to reduce the size of a data array (e.g. feature map) that is input into the pooling layer. The pooling layer may produce (output) a data array (e.g. a further feature map) which is an "equivarient" representation of the data array that was input into the pooling layer (meaning that the representation is almost invariant to changes in the scale and position of features in the data array that was input into the pooling layer).

The neural network may comprise further convolutional layers 50d, 50f, 50g and pooling layers 50e, 50h, 50i.

After the one or more convolutional and/or pooling layers, the CNN may comprise a fully connected (FC) layer 50j. The fully connected layer may operate on a data array (e.g. feature map) generated by the convolutional and/or pooling layers.

Alternatively (although not shown in FIG. 5A), the neural network could comprise multiple fully connected layers. In this case the fully connected layers may operate one after the other such that the data that is output from one fully connected layer is used as the input data for a next fully connected layer. The final fully connected layer may produce a final output data array or output data set which may comprise a useful output (e.g. an identification or classification of an object in the image data that was originally received by the input layer of the CNN).

The final fully connected layer passes the useful output to the output layer 50k of the neural network. The output layer 50k comprises a number of processing nodes which receive the useful output data and pass the useful output data on towards other components of the data processing system which are outside of the neural network (e.g. such as further processing and display components which can display the output data, for example). The output layer may convert the result from the previous layer to probabilities, for example by using softmax function.

Although FIG. 5A shows a certain number of layers, the neural network may comprise fewer or more layers if desired (and may also or instead comprise other layers which operate in a different manner to the convolutional, pooling and FC layers described herein).

The amount of processing capability required to process a layer may be different for different layers of the neural network, for example depending on the type, amount or complexity of processing required to process a particular layer.

Layers of the neural network utilise parameter (e.g. weight) data when processing data arrays (e.g. feature maps). The processing capability required to process a layer may therefore be related to the size of a data array (e.g. input feature map) that the layer is configured to process, the parameters (e.g. weight map) that the layer will use to the process the data array, and the size of a data array that is to be output by the layer. These sizes may be known or predictable in advance of performing the neural network processing.

Figure 5B:
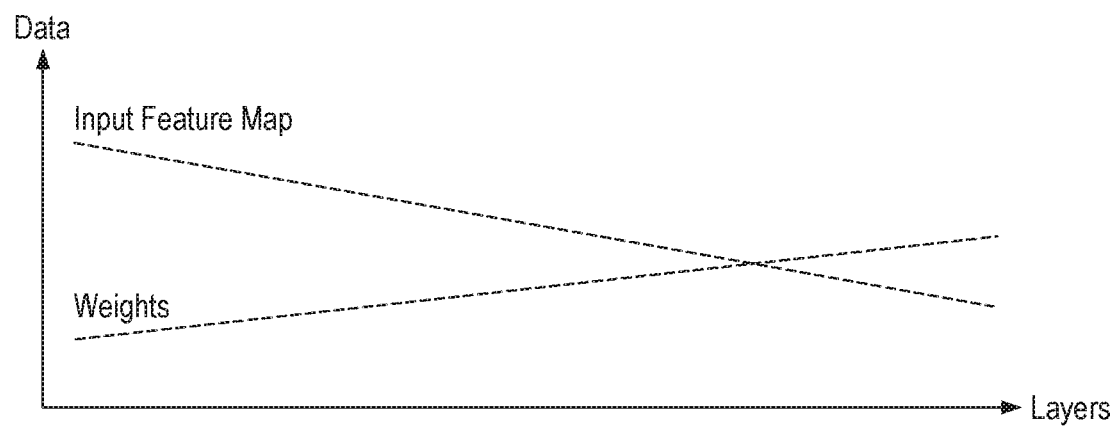
FIG. 5B illustrates how the size of the input feature maps and weight arrays for neural network processing may change across layers of neural network processing.

As shown in FIG. 5B, generally, the amount of data associated with an input feature map (i.e. the size of the input feature map) that is to be processed by a layer decreases for subsequent or later layers in the neural network processing due to pooling, whilst the parameters or arrays (e.g. weight map) used to process the input feature map increase in size or complexity. The amount of buffering and bandwidth for accessing the feature maps and weight maps will also follow this trend, thereby resulting in different processing capabilities being required to process different layers.

Figure 6:
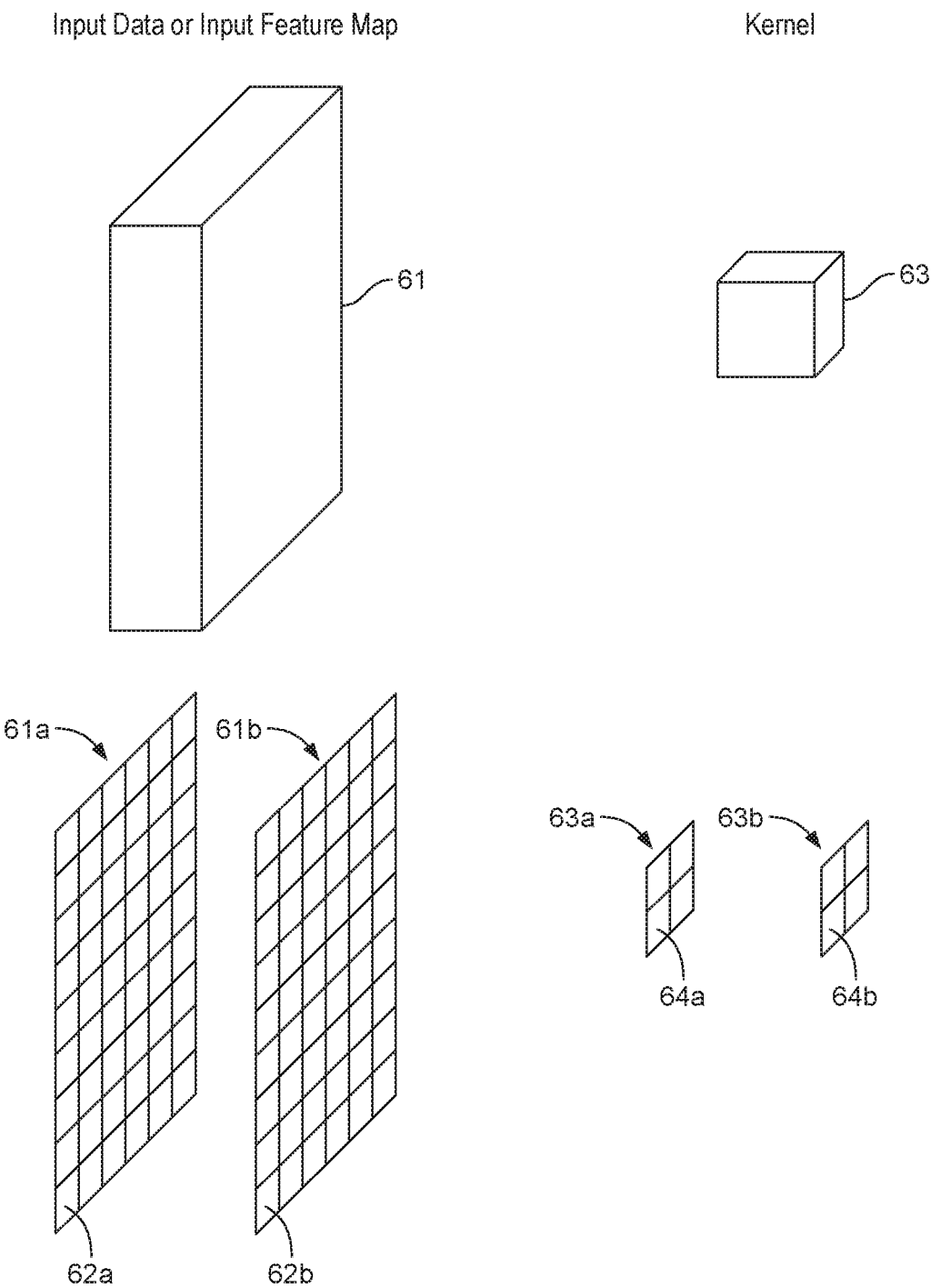
FIG. 6 shows an input feature map consisting of two channels which may comprise an input for a layer of neural network processing, and a kernel consisting of two channels which may be used when performing a layer of processing.

FIG. 6 shows input data 61 (e.g. an input feature map) for a layer of neural network processing. The input data 61 consists of two 2D arrays of data 61a and 61b, being composed of data positions 62a and 62b respectively.

When performing processing for a layer 61, a kernel 63 may be used process the layer. The kernel 63 may also comprise two 2D data arrays 63a and 63b (e.g. weight arrays) composed of data positions (data values) 64a and 64b respectively. The kernel arrays 63a and 63b are used to process data arrays 61a and 62b respectively (e.g. by convolving the kernel with the respective data array in a step-wise manner).

In this manner the input data may be processed according to two "channels", the first channel corresponding to the processing for data array 61a and the second channel corresponding to the processing for data array 61b. The different channels may be used for different components of input data to be processed by the neural network (e.g. different colour components of image data). It will be appreciated that fewer or more than two "channels" could be used when processing input data.

Figure 7:
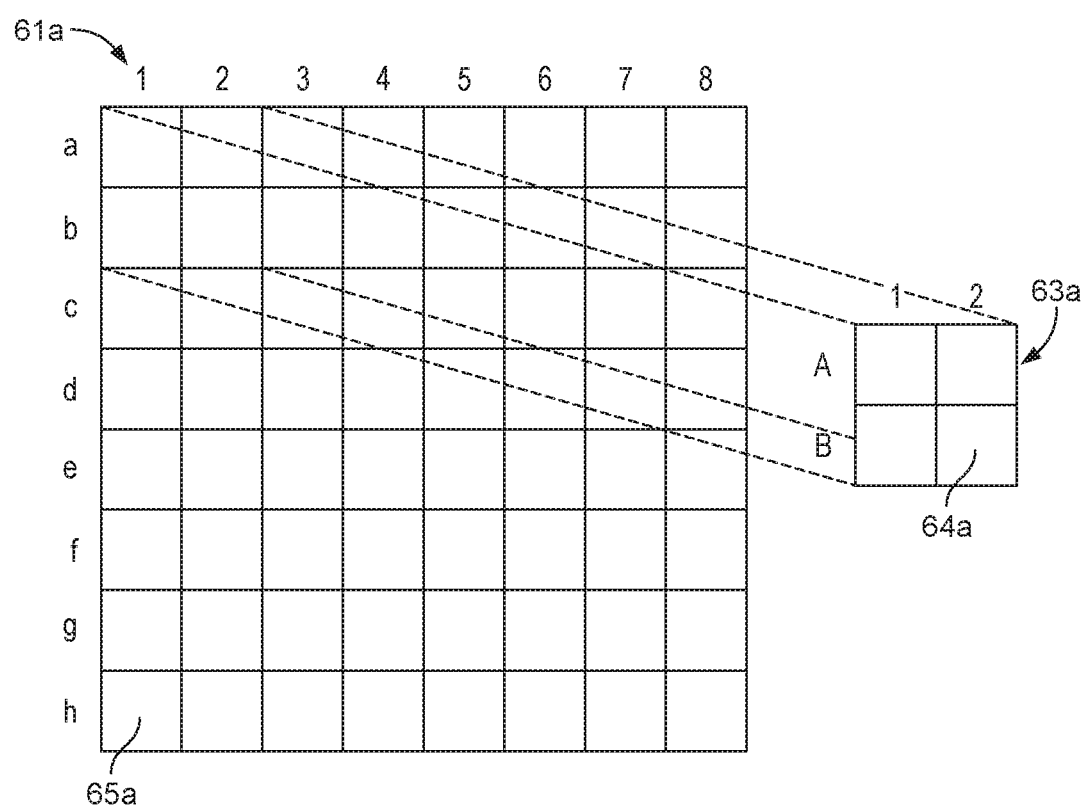
FIG. 7 illustrates convolving a kernel and an input feature map.

FIG. 7 illustrates processing of an array of input data 61a (e.g. a channel of a feature map) using a kernel array 63a (e.g. a weight array) when performing layer processing.

The processing using a weight array 63a generally involves convolving the weight array with the array of input data 61a. The convolving may involve the following steps.

First, a multiply accumulate operation is performed with the weight array 63a at a first position relative to the input data array 61a to generate an output data value Y for that position. For instance, at the position shown in FIG. 7, the output data value Y of a multiply accumulate operation for a single channel could be calculated as follows:

$$Y = a1.A1 + a2.A2 + b1.B1 + b2.B2 + \gamma$$

where $\gamma$ is a bias which may be added.

Although FIG. 7 shows a single channel, in most cases there will be multiple channels being processed, and so the result for channel 1 will be added to the result of channel 2 etc, and the bias added, such that:

$$Y = (ch1\_1.CH1\_1 + ch1\_2.CH1\_2 + ch1\_1.CH1\_1 + ch1\_2.CH1\_2) + (ch2\_1.CH2\_1 + ch2\_2.CH2\_2 + ch2\_1.CH2\_1 + ch2\_2.CH2\_2) + \text{bias}$$

The weight array 63a is then moved to another position relative to the input data array 61a, and a similar multiply accumulate operation is performed to generate another output data value. By moving or "sliding" the weight array over the input data array in this manner, an output data array may be constructed. The amount of data that is stepped over each time the weight array is moved for generating the next output feature map value, is indicated by the stride. A stride of 1 means that the kernel slides one input data value. A stride of 2 means that the kernel slides 2 input data values, etc. The output data array may comprise the output data values generated at the different locations of the weight array.

Further processing, such as applying an "activation function", may be performed on the data values Y of the output data array. The activation function may be a ReLU, sigmoid or tan h(Y) function, or any other suitable function.

Generally, for convolutional layers, pooling or fully connected layers, the weight values of the weight array 63a and any further processing will have been selected to extract or identify certain features within the input data array (such as e.g. edges within an image), so that the values of the output data array represent these features. Hence, the output data array may be termed an "output feature map".

As described previously, the Applicants have recognised that it is possible to distribute neural network processing among plural processors, instead of having to perform the neural network processing on a single processor.

The Applicants have recognised that, since neural networks may comprise multiple layers of processing, it is possible to distribute the layers of the neural network processing among the processors. Hence, in embodiments, a processor may be assigned an entire layer, plural entire layers or part of a layer to process.

Figure 8:
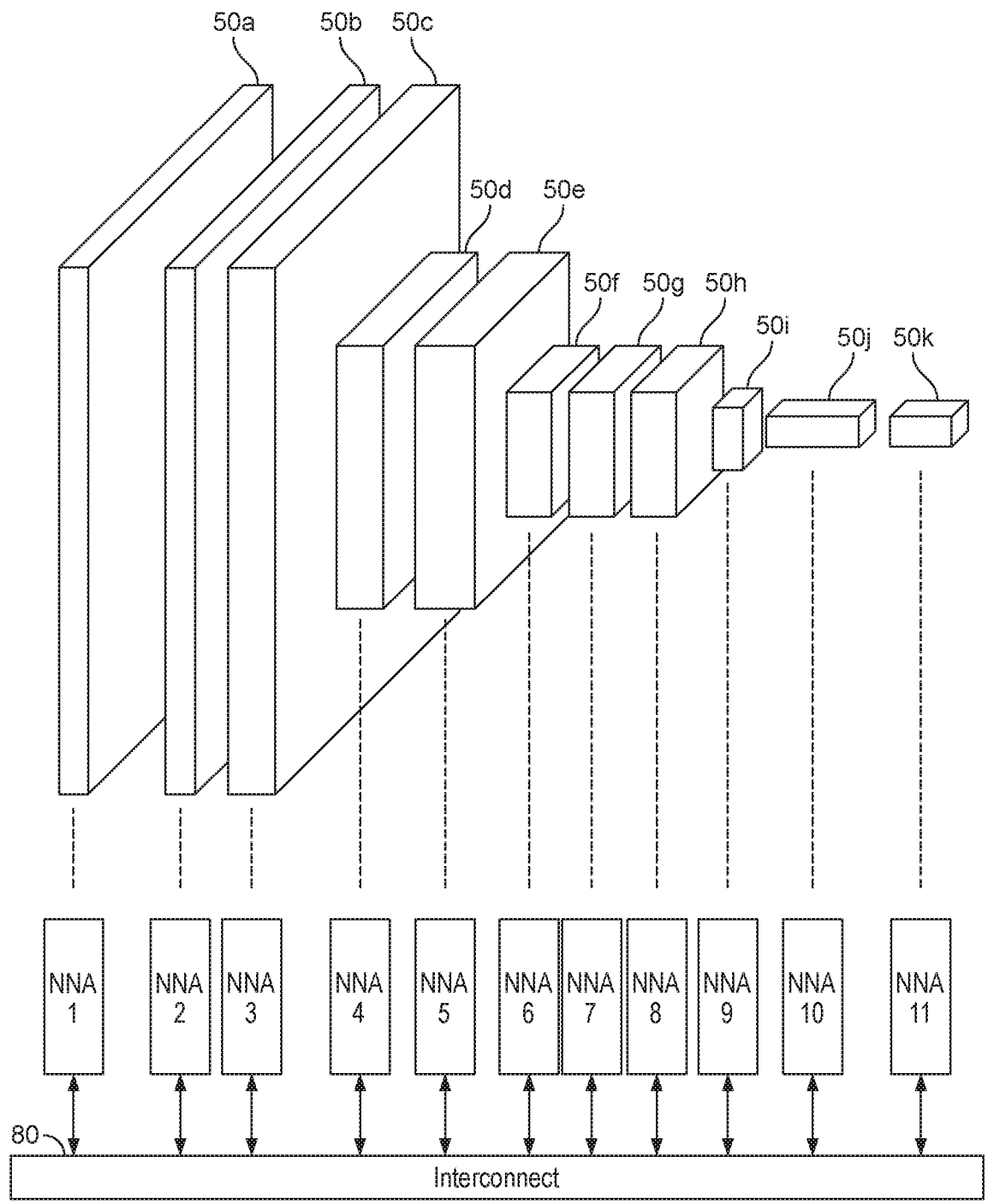
FIG. 8 shows a distribution of neural network processing in which each processor is assigned a layer to process.

FIG. 8 illustrates one embodiment in which the layers 50a-50k of the neural network processing 50 are distributed among plural neural network accelerators (NNA1 to NNA11). In this embodiment, each layer is assigned to a different neural network accelerator. The neural network accelerators are connected to each other via an interconnect 80, similar to that described with respect to FIGS. 1 to 3.

The embodiment shown in FIG. 8 is one possible way to distribute the neural network processing. However, as noted previously, the processing requirements of the different layers of the neural network may vary (e.g. due to the size of the input data array, output data array, and weight arrays differing, or due to the differences in the complexity of layer processing). Therefore, if the layers are simply distributed so that each layer is assigned to a different processor, as in FIG. 8, it is likely that the different processors will take different amounts of time to complete their assigned layer processing. This could result in some neural network processors stalling, and becoming idle whilst waiting for data from other neural network processors, resulting in poor processing efficiency.

Figure 9:
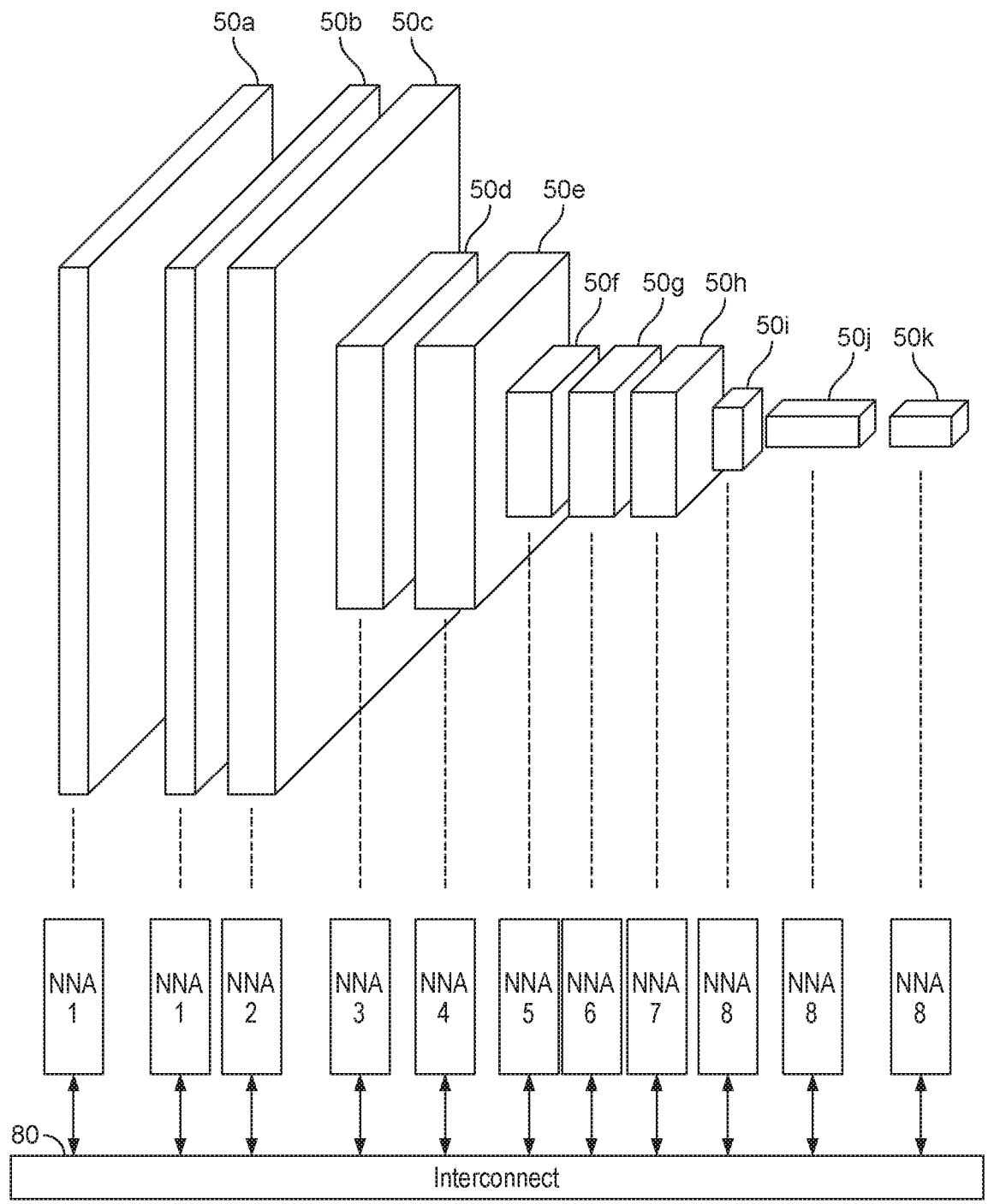
FIG. 9 shows a distribution of neural network processing in which some processors are assigned multiple layers to process.

The Applicants have recognised that one possible way to reduce stall and inefficiency in neural network processing is to vary the number of layers (or parts of layers) that are assigned to each processor. FIG. 9 shows an embodiment in which different processors may be assigned different numbers of layers.

In the embodiment shown in FIG. 9 some processors (e.g. NNA1 and NNA8) are assigned more than one layer to process, whilst other processors (e.g. NNA2, NNA 3, NNA4, NNA5, NNA6 and NNA7) are assigned a single layer.

The particular distribution of layers may be determined based on the processing requirements for the layers and also the processing capabilities for each of the processors. For example, processors with a relatively greater processing capability may be assigned more layers than processors with relatively less processing capability. For example, a processor may be assigned more than one layer if it is determined that the processor is capable of processing more than one layer within a threshold amount of time.

Alternatively multiple layers may be assigned to a single processor if it is determined that those layers are each below a certain threshold size (i.e. require less than a threshold amount of processing capability to be processed).

The neural network processing may also be distributed such that some layers are divided among plural processors (such that some processors are assigned part of a layer). This is shown in FIG. 10.

Figure 10:
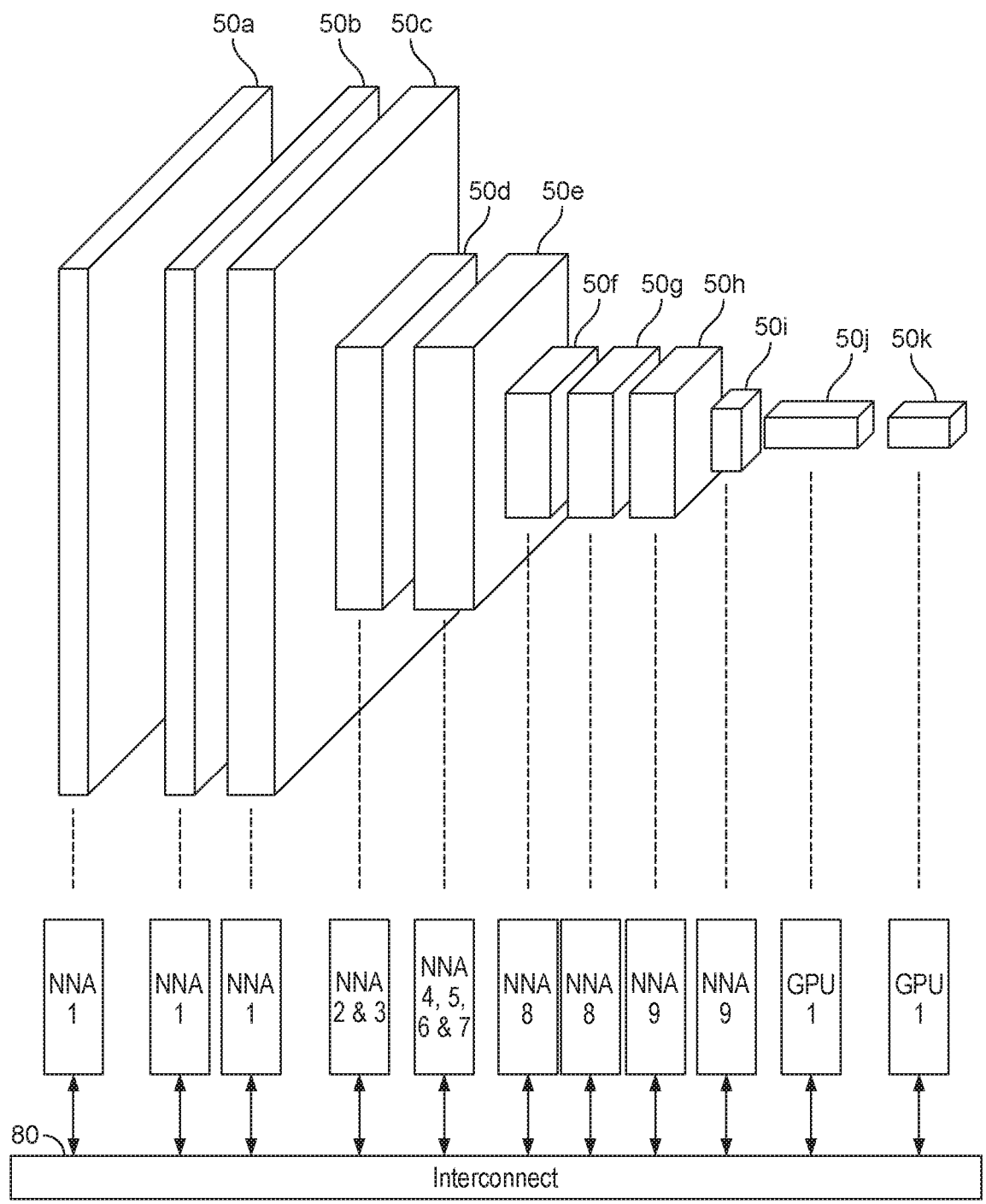
FIG. 10 shows a distribution of neural network processing in which some layers are divided among plural processors.

For example, in the embodiment shown in FIG. 10, layer 50d is divided among NNAs 2 and 3 (such that each of NNAs 2 and 3 is assigned a portion of the processing for layer 50d), and layer 50e is divided among NNAs 4, 5, 6 and 7 (such that each of NNAs 4, 5, 6 and 7 are assigned a portion of layer 50e).

FIG. 10 also shows some NNAs being assigned being assigned multiple entire layers for processing, e.g. such as NNA1 which is assigned layers 50a, 50b and 50c.

In the embodiment shown in FIG. 10 some of the neural network processing is also distributed to processors which are not NNAs. For example, layers 50j and 50k are assigned to GPU1.

The data processing system of the technology described herein may perform tile-based processing of a neural network. In this case, processors of the data processing system are operable to process any layers (or parts of layers) to which they are assigned on a tile-by-tile basis. Each tile may correspond to a block of data which is to be processed when performing layer processing. Processing of each tile may generate a block (region) of output data from the block (region) of input data that was used for that tile.

In tile-based processing, a processor will process tiles one after the other, such that the processor completes the processing for one tile before moving on to process a next tile.

Figure 19:
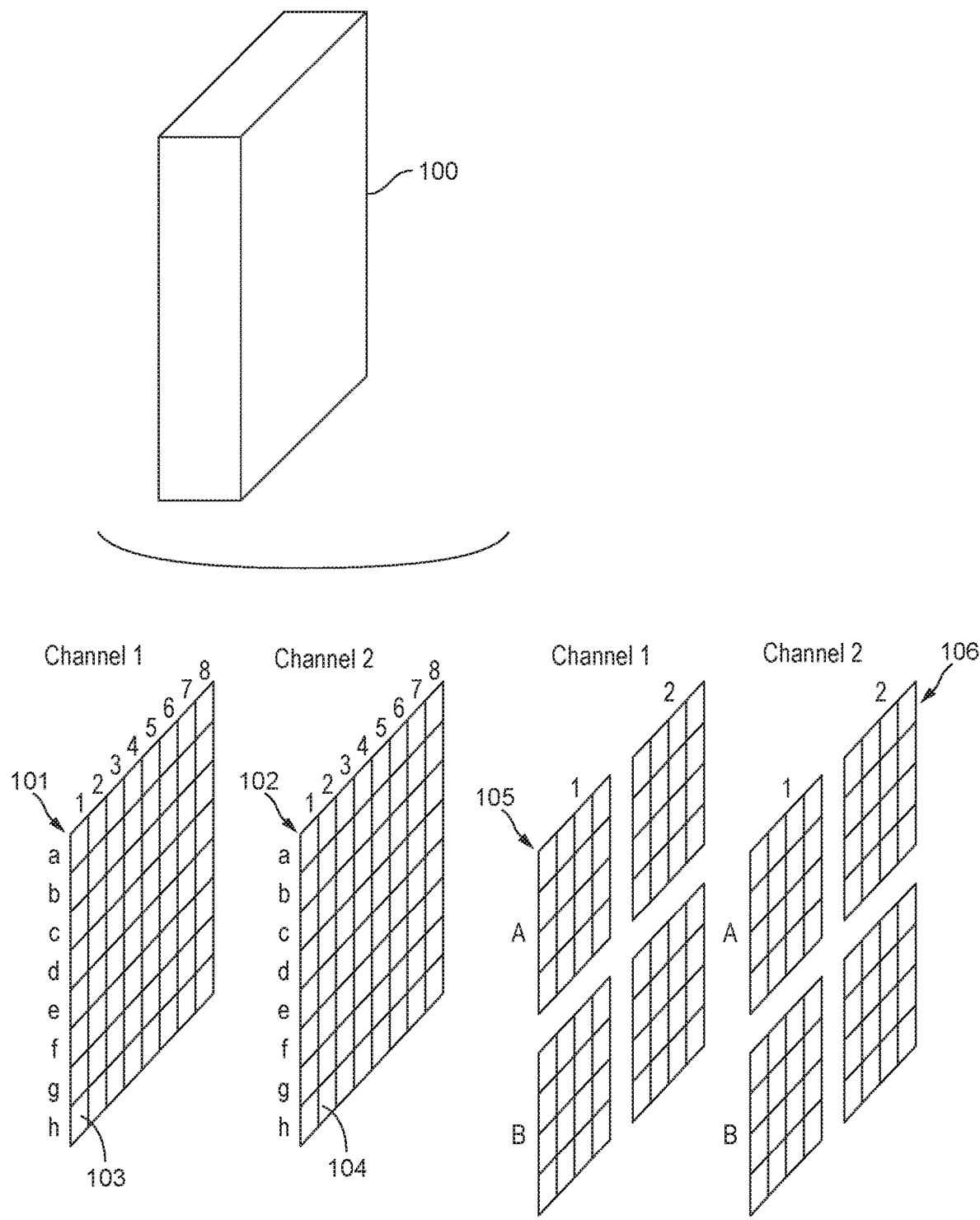
FIG. 19 illustrates a layer of neural network processing being divided into four tiles.

FIG. 19 illustrates how a layer 100 may be divided into plural tiles for tile-based processing. The layer 10 comprises two channels (similar to the channels discussed with regards to FIG. 6. Each channel corresponds to the processing for a respective data array 101, 102. The data array may correspond to input data for the layer, such as an input feature map. The data arrays 101, 102 are composed of data positions 103 and 104 respectively.

The layer may be divided into plural tiles 105, 106. FIG. 19 shows four tiles for each channel. Each tile comprises a block of data positions 103, 104 from one of data arrays 101 and 103. The tiles are shown as being square.

The Applicants have recognised that, in data processing systems configured to perform tile-based processing, it may be possible to distribute different tiles of a layer of neural network processing to different processors for processing. Hence, in embodiments, when a layer of neural network processing is divided among plural processors, the portion of the layer that is assigned to each of those processors may correspond to one or more "tiles" of the layer processing. Each processor may process the block of input data corresponding to its assigned tile to produce a block of output data. The output data from each of the processors may be combined to produce the output data array (e.g. output feature map) for the layer.

Figure 11:
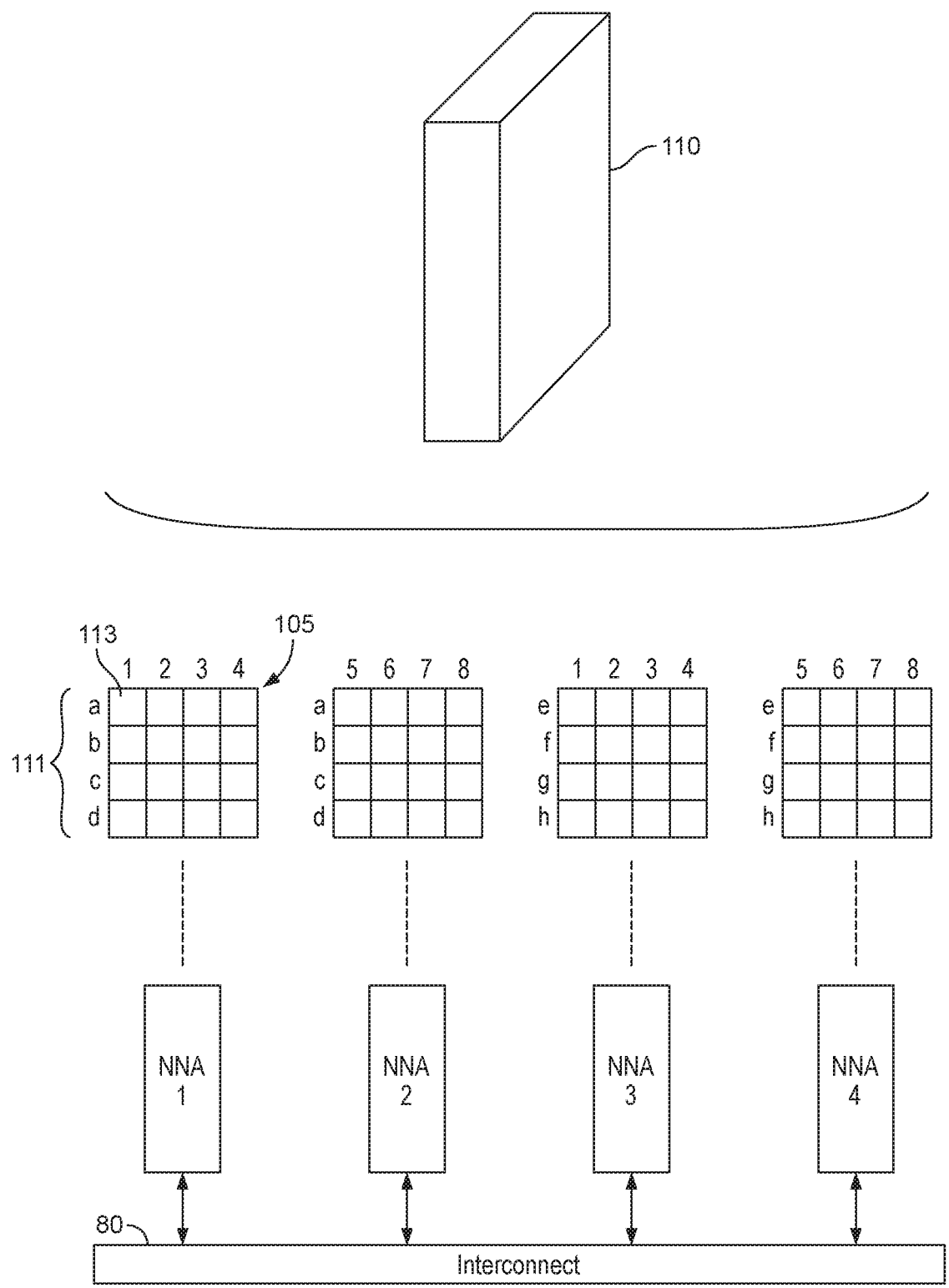
FIG. 11 illustrates a layer of processing being divided among plural processors.

FIG. 11 illustrates how tiles of layer processing may be divided among plural processors. The layer 110 corresponds to processing required to process a data array 111 composed of data positions 113 (in a similar manner to the layer described with respect to FIG. 10). The data array may be divided into plural blocks 115, each block corresponding to plural data positions of the data array. Each block 115 of the data array corresponding to a "tile" of layer processing.

In FIG. 11, each tile of processing is assigned to a different processor of the processors NNA1, 2, 3 and 4 for processing. However, in alternative embodiments, multiple tiles may be assigned to a single processor (e.g. NNA1 could be assigned two or more tiles to process). In embodiments, different processors could be assigned different numbers of tile, e.g., based on the processing capability of those processors.

Figures 12A, 12B, 12C, 12D:
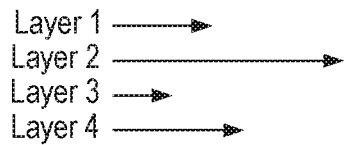
FIGS. 12A-12D show the work associated with processing various layers of a neural network, and illustrate how timing can be optimised by using different distributions of neural network processing.

As discussed, in embodiments, the distribution of neural network processing among the processors may be determined based on a processing capability (e.g. a compute capability and/or a local storage capacity) of the processors and also based on an amount of processing capability required for processing a portion (e.g. a layer or part of a layer). In embodiments, the distribution is determined such that each of the processors will finish their assigned processing in approximately the same amount of time. FIGS. 12A to 12C illustrate this.

In particular, FIG. 12A shows four layers of processing for an exemplary neural network. The layers may comprise consecutive layers of processing, such that performing the layers of processing one after the other results in an overall output for the neural network processing.

In the embodiment shown in FIG. 12A, each of the layers has a different amount of work associated with performing the processing for the layer, as depicted by the arrows of different lengths next to each layer. In other words, each of the layers requires a different amount of processing or a different processing capability to execute that layer.

FIG. 12B shows an exemplary distribution of the layers among four processors.

In this case, each layer is assigned to a different processor, so that each processor will process a single layer. Hence, in this embodiment, when processing an input data array (e.g. an image) by the neural network, the image will be processed according to a first layer (Layer 1) of processing by NNA1. Once the first layer of processing has been performed, the output from that layer of processing will be used as an input for a next layer of processing (Layer 2) which will be performed by NNA2. The output from performing the processing for Layer 2 will form the input for processing for Layer 3 (performed by NNA3), and the output from Layer 3 will form the input for processing for Layer 4 (performed by NNA4). The output from Layer 4 may comprise a final output for the neural network processing. In this manner, the processors will act consecutively to process the layers of the neural network, such that once a processor has completed its assigned layer of processing, a next processor can begin the next layer of processing.

However the approach shown in FIG. 12B does not factor in the amount of processing required for each layer. Since the different layers require different amounts of processing, the processors will likely take different amounts of time to process their assigned layers. This would not necessarily be a problem if the neural network processing is executed entirely for a single input data array (e.g. image) before starting processing of another input data array (e.g. image).

However it may be desirable to reduce latency in the data processing system by commencing processing of a new (next) input data array as soon as a processor (NNA1) is available.

In other words, a first layer of processing (layer 1) may commence for a new (next) input data array, once the processor (NNA1) for performing the first layer of processing (layer 1) is available. Similarly, the second layer of processing (layer 2) may commence for the new (next) input data array once the processor (NNA2) for performing the second layer (layer 2) is available. The same follows for the third, fourth, etc. layers.

Hence, the data processing system may be used to process multiple input data arrays (e.g. images) at once, with a next layer of processing being performed for each input data array as soon as the assigned processor for that layer is available.

The Applicants have recognised that in such situations where a data processing system is used to process multiple input data arrays (e.g. images) at once, if the processors finish their assigned processing within different times, then a processor which finishes more quickly may have to remain idle whilst it waits for a next processor (performing a next layer) to finish. This is illustrated in the latency bar of FIG. 12B.

In the case shown in FIG. 12B, NNA2 takes the longest time to perform its associated layer of processing, and accordingly data for a next input data array (e.g. corresponding to a next image being processed) cannot be transferred to or from NNA2 until NNA2 finishes its processing. Hence, the time to process layer 2 by NNA2 sets the rate at which images can progress through the layers of the neural network. The result is that each of the processors NNA1, NNA3 and NNA4 (which can execute their associated layers more quickly) will remain idle whilst waiting for NNA2 to complete the processing for layer 2.

The result is that the total amount of time taken to perform neural network processing of an input data array (e.g. an image) by NNAs1-4 may be relatively long (as shown by the total length of the latency bar of FIG. 12B). Therefore, the embodiment shown in FIG. 12B may not be the most efficient way of processing the neural network on the four available processors.

For ease of illustration, FIG. 12B shows each processor starting processing its assigned layer once the (entire) previous layer has been processed. However, data could be provided from one layer to be used when processing the next layer as soon as that data has been computed, for example if tile based processing is used (and in practice, this may be done). This would then allow (and cause) some overlap between layer processing.

However, as the latency bar of FIG. 12B shows, in either use, if one layer takes significantly longer to process than the other layers, the other processors may spend a large amount of time idle.

FIG. 12C is shows an embodiment utilising a different distribution of the neural network layers. In FIG. 12C, layer 2 (this is the layer that requires the most processing capability) is divided into tiles and is distributed between NNA 2 and NNA3.

In the embodiment of FIG. 12C, both layers 3 and 4 (which require relatively less processing capability) are assigned to the same processor, NNA4.

The effect of this modified distribution is that the amount of processing is more evenly distributed among the processors, so that the processors will take a more similar amount of time to complete their assigned processing. This is illustrated in the associated latency bar. In this case, NNA1 and NNA4 only remain idle until the NNA 2 and NNA3 have finished their assigned processing. The total amount of time for which the processors are idle is therefore much less than the embodiment of FIG. 12B.

So, by assigning different numbers of layers (or parts of layers) to different processors, it is possible to improve the overall efficiency of the neural network processing.

In the distribution shown in FIG. 12C, the speed at which neural network processing can progress from one layer to a next layer is restricted by the amount of time taken by NNA2 and NNA3 to perform their associated processing (since these processors take the longest time to perform their associated processing). As a result NNA1 and NNA4, when operating at their normal processing rate, will need to remain idle until the time for performing processing by NNA2 and NNA3 has elapsed.

The Applicants have recognised that it may be possible to save power within the data processing system by operating NNA1 and NNA4 at a reduced rate (e.g. at a lower clock frequency), instead of having these processors operate at their normal rates and then remain idle. This is because operating processors with reduced processing rates allows those processors to be supplied with a lower voltage and at a lower frequency (therefore requiring less power to operate those processors).

FIG. 12D shows a distribution that is the same as shown in FIG. 12C, but using modified processing rates for NNAs 1 and 4, which may lead to power savings in the data processing system. In particular, in the embodiment of FIG. 12D, the processing rate (clock frequency) of NNAs 1 and 4 has been decreased so that the portions assigned to these processors are processed more slowly.

In particular, in the embodiment of FIG. 12D, NNAs 1 and 4 have been modified so that they will take the same amount of time as NNAs 2 and 3 to process their assigned portions of neural network processing, so that NNAs 1 and 4 do not spend time idle. This is shown in the associated latency bar.

Although it is discussed above that the efficiency of neural network processing can be improved if all of the processors take approximately the same amount of time to perform their assigned processing, it may be useful to offset in time the processing performed by the processors to prevent the processors from simultaneously requesting data (e.g. input feature maps, or weight arrays) and causing the system to be overburdened with data requests. The offsetting may be performed in any suitable manner.

It is therefore apparent that, in embodiments, the neural network processing is distributed among plural processors in a manner that may increase the efficiency which the neural network may be processed. The Applicants have also recognised that the efficiency of neural network processing may be increased by controlling the transfer of data to and from (and between) processors that are executing layers of parts of layers.

Figure 13:
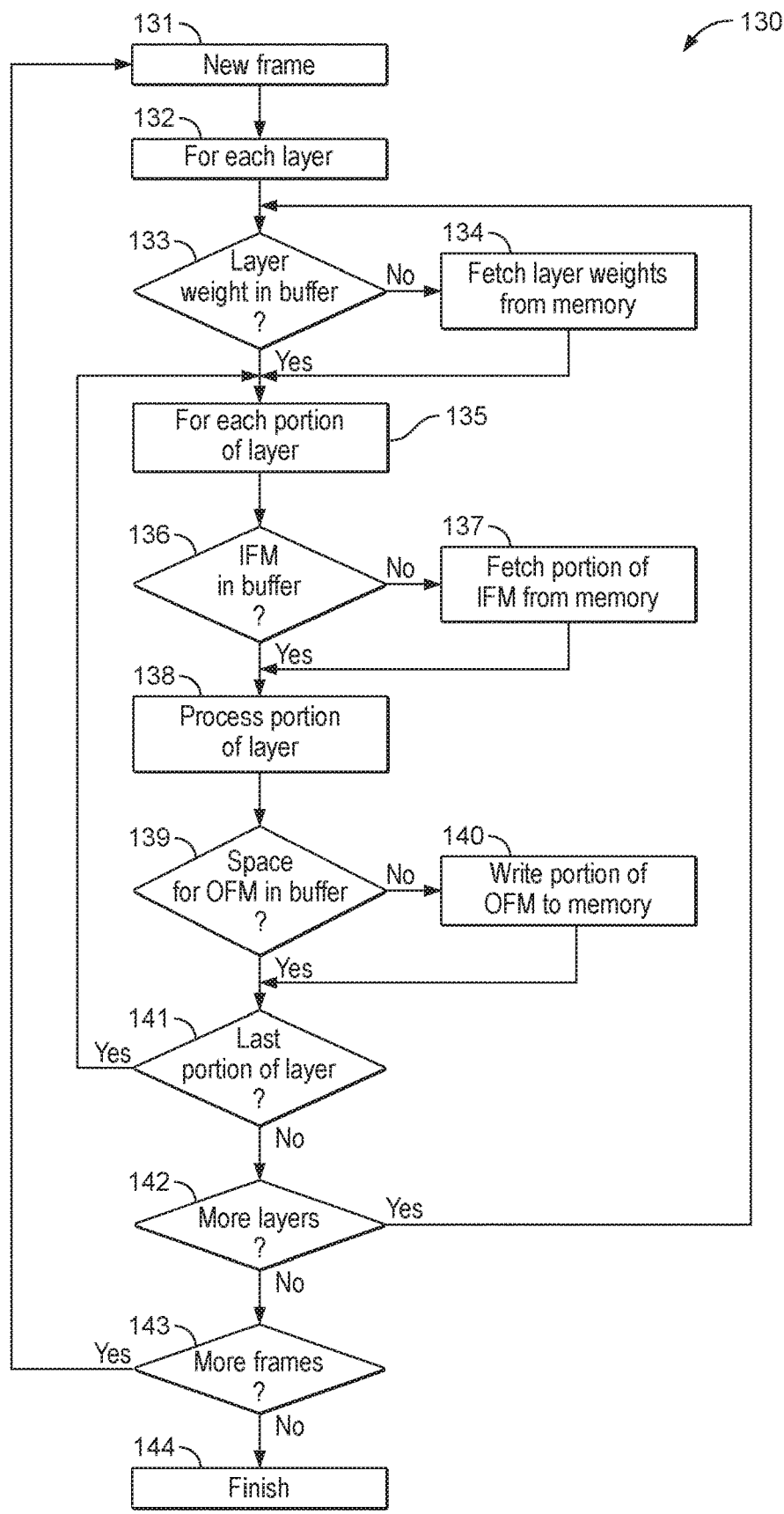
FIG. 13 is a flowchart showing how processes for fetching data for neural network processing.

FIG. 13 provides an overview of how the layer data (e.g. input feature maps, weights maps, and output feature maps) may be requested from memory and written to memory. FIGS. 14 to 16 illustrate the timing of these requests in embodiments, when performing neural network processing of single or multiple layers.

FIG. 13 is a flowchart 130 showing neural network processing, and particularly the memory access that may be required when performing neural network processing.

At step 131, a new frame (e.g. corresponding to image data) is received as input data. At step 132, a layer of neural network processing commences. The layer will process the input data according to weight data (e.g. a weight array), as discussed previously. The weight data is stored in a main external memory. However, in order for a processor to use the weight data, the weight data must be read into local (e.g. on-chip) memory, such as a buffer. Hence, at step 133 it is determined whether the weight data for the layer is currently held in the buffer. If it is not, then the layer weights will be fetched from main memory (step 134).

Once the required layer weights are held within the buffer, the processor can proceed with layer processing. As discussed previously, the layer may be processed according to tile-based processing, such that the portions ("tiles") of the layer processing are performed one after the other. Hence the steps 136 to 141 are performed for each portion of the layer (as set out in step 135).

The layer processing will generally comprise processing an input data array (e.g. an input feature map) to produce an output data array (e.g. output feature map). The input feature map to be processed may be stored in the main external memory. The layer portion "tile" may only process a portion (subset) of the input data array. In order for a processor to be able to process the layer portion ("tile") it is necessary for the relevant portion of the input data array to be present in local memory (buffer). Hence, at step 136 it is determined whether the relevant portion of the input data array (input feature map, IFM) to be processed is currently held in the buffer. If the required portion of the input feature map is not in the buffer, then at step 137 that portion is fetched from main memory into the buffer. The processor then processes the layer portion at step 138, and generates a portion of an output feature map (OFM) for the layer. If there is enough space in the buffer (step 139) then the portion of the OFM may be stored in the buffer. However, if there is not enough space, the portion of the OFM will be written to main memory (step 140).

It is then determined whether there are any more portions ("tiles") of layer processing to be performed (step 141). If so, then steps 135 to 141 are repeated for a next tile of layer processing.

Once all the portions ("tiles") of layer processing are complete it is checked whether there are any more layers of processing to be performed (step 142). If so, then steps 133 to 141 are repeated for a next layer of the neural network processing. In not, then it is checked whether there are any more frames to be processed by the neural network (step 143). The flowchart finishes (step 144) once all the required frames have been processed by the neural network.

As demonstrated in FIG. 13, during the neural network processing it may be necessary to fetch weight data and input feature maps from main memory, and to write output feature maps to main memory.

Figure 14A:
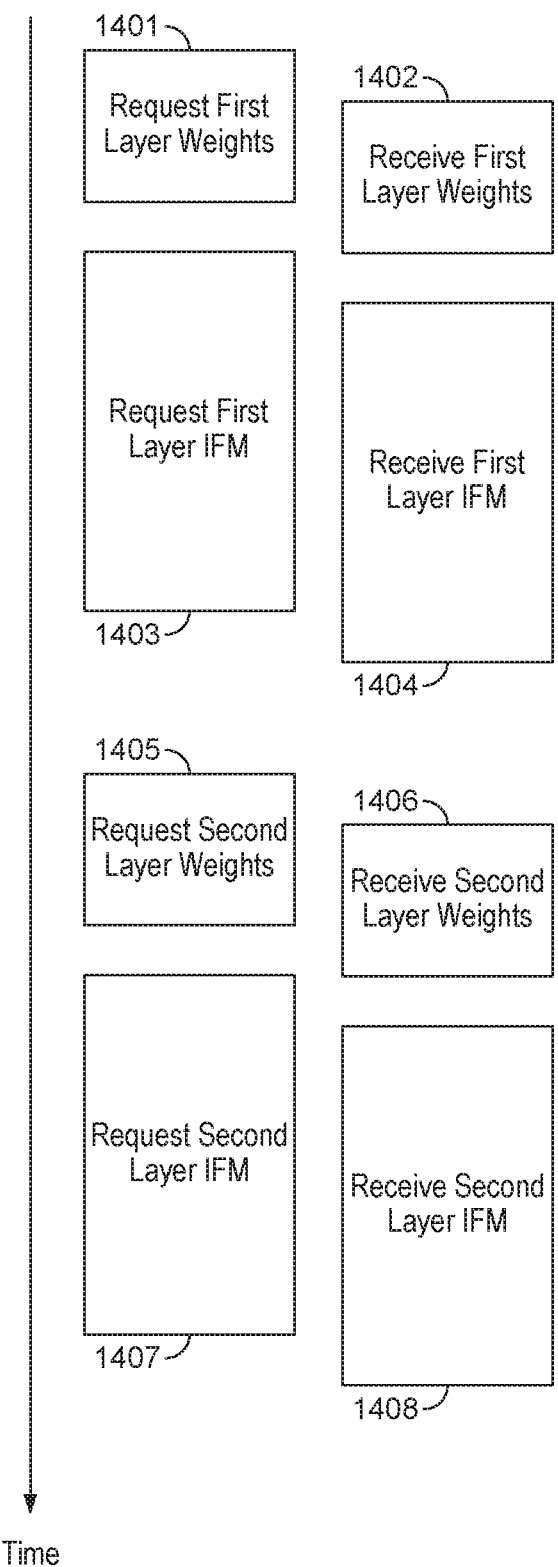
FIGS. 14A and 14B show weight requests in a neural network where a single layer is processing layers of the neural network.
Figure 14B:
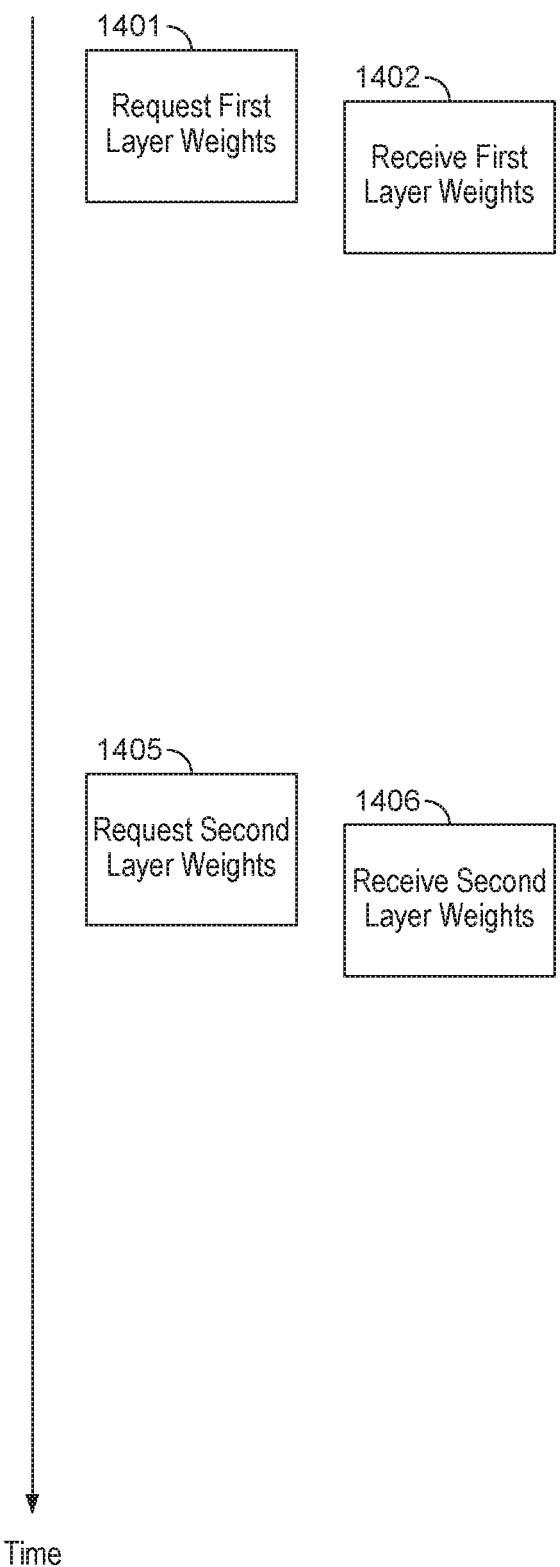

FIGS. 14A and 14B show timing diagrams for memory requests when a single processor is processing multiple layers of a neural network one after the other (which may occur in embodiments of the technology described herein where the neural network processing is distributed such that a processor may be assigned plural layers to process).

In the embodiment shown in FIG. 14A, the weight data and the input feature maps (IFMs) required for the layer processing are not held within a local buffer, and therefore need to be requested from main memory. Hence, the first event in the timing diagram is that the processor requests the weight data for a first layer 1401. Once the first layer weights are received 1402 from main memory and loaded into a local buffer, the processor then requests the input feature map (IFM) for the layer 1403. The processor can proceed with performing layer processing as the IFM is received from main memory and loaded into a local buffer.

The processor then sends similar memory requests when processing a second layer, as shown at steps 1405, 1406, 1407 and 1408.

Some of the memory requests described in relation to FIG. 14A can be omitted if the weight data or the IFM data is already present in the local buffer. In the embodiment shown in FIG. 14B, the IFM data is already present in the local buffer, and so memory requests only need to be made for the layer weights (which are not already present in the local buffer). Hence, the timing diagram shows the events 1401 for requesting the first layer weights, 1402 for receiving the first layer weights, 1405 for requesting the second layer weights, and 1406 for receiving the second layer weights.

Figure 15A:
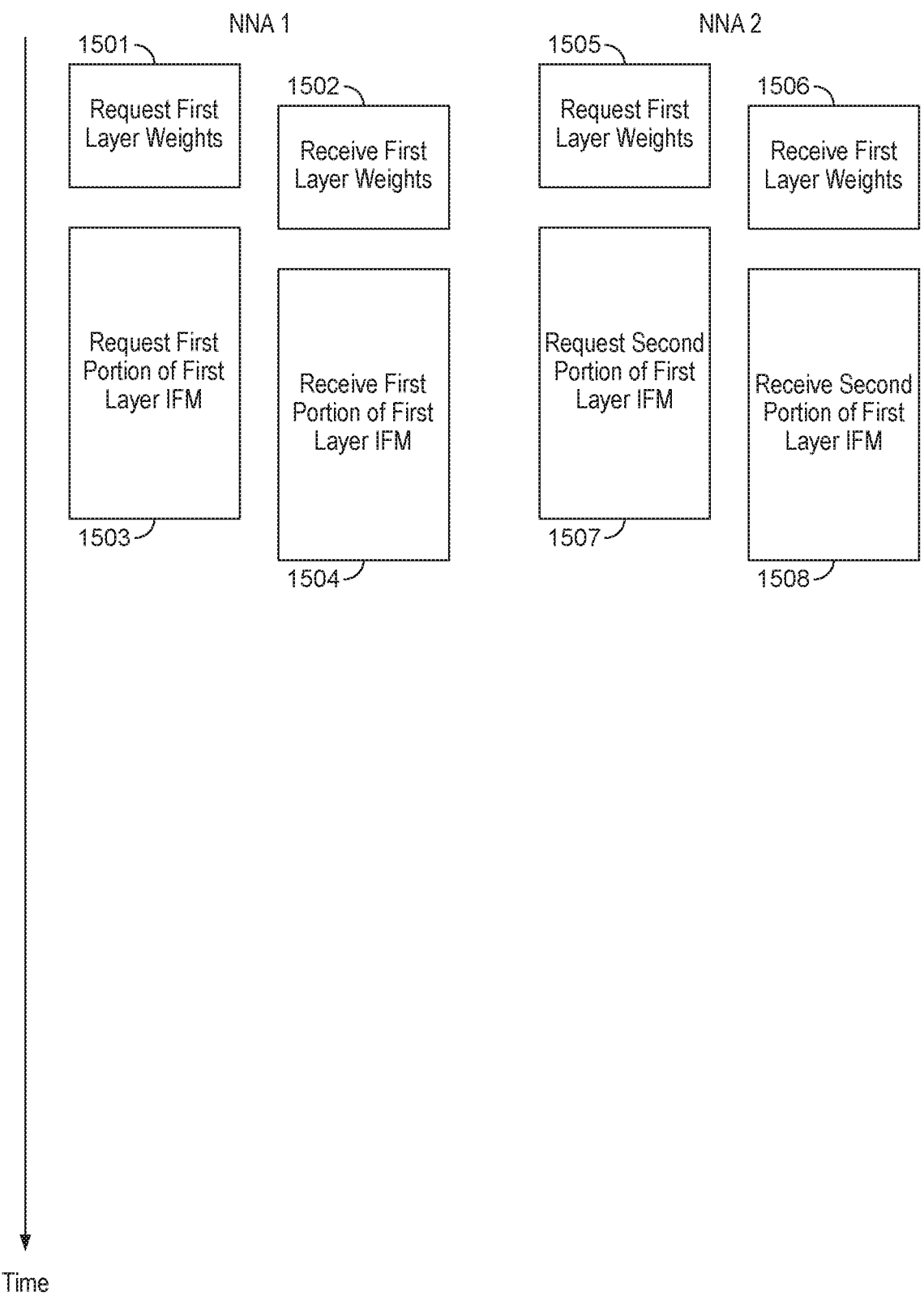
FIGS. 15A and 15B shows weight requests in a neural network where two processors independently submitting requests for weight data when processing neural network layer.
Figure 15B:
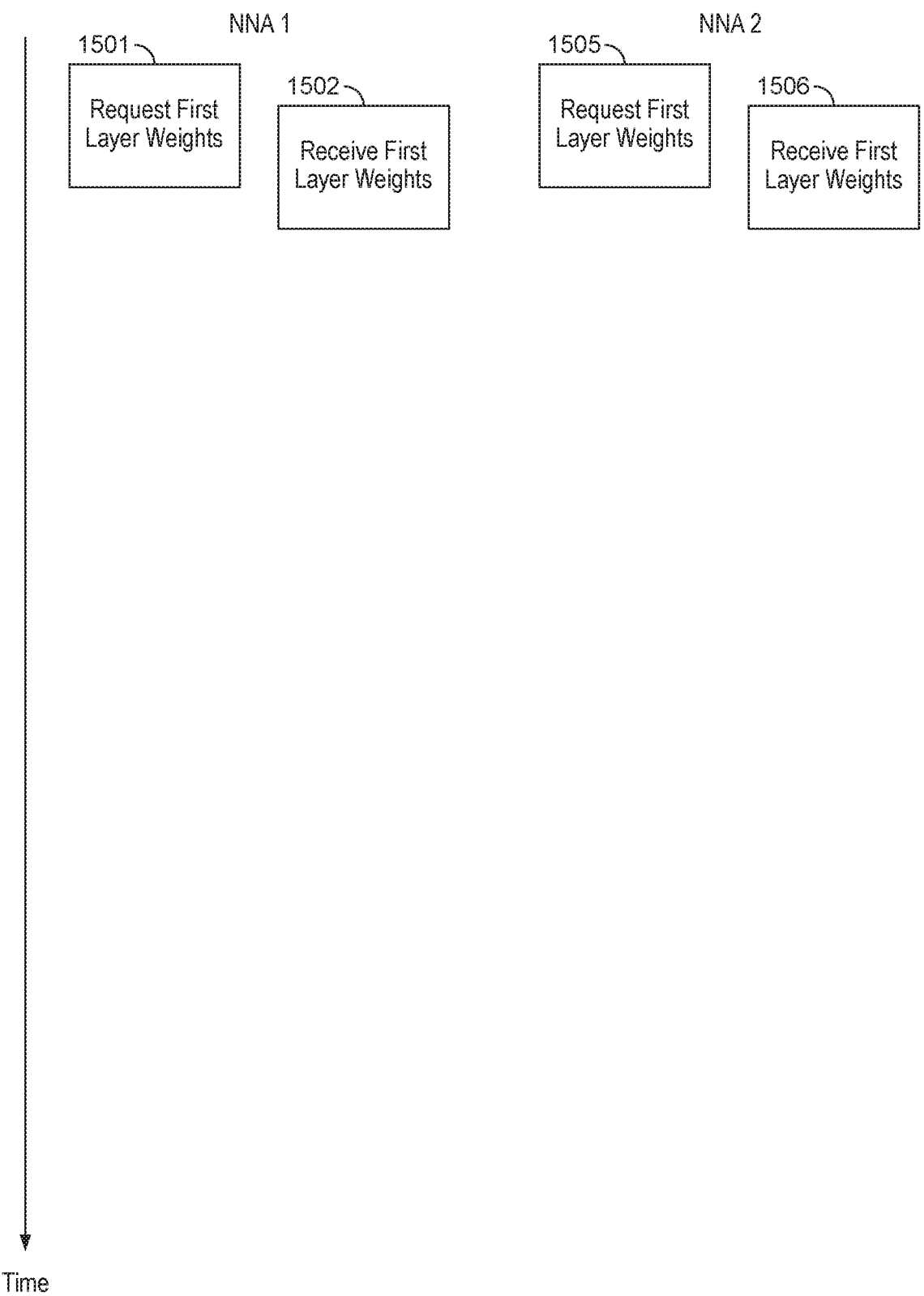

FIGS. 15A and 15B show timing diagrams for memory requests when a layer is divided among plural processors such that a first processor NNA1 processes a first portion of the layer and a second processor processes a second portion of the layer (such a distribution may be used in embodiments of the technology described herein, as discussed previously)

In the embodiment shown in FIG. 15A, the weight data and the input feature maps (IFMs) required for the portions of layer processing are not held within a local buffer, and therefore need to be requested from main memory. Hence, the first event in the timing diagram for the first processor (NNA1) is that the first processor requests the weight data for the layer 1501. Once the weights are received 1502 from main memory and loaded into a local buffer, the first processor then requests a first portion of the input feature map (IFM) for the layer 1503. The first processor can proceed with performing layer processing as the first portion of the IFM is received 1504 from main memory and loaded into a local buffer.

Analogous events (requesting the weight data 1505, receiving the weight data 1506, requesting a second portion of the IFM for the layer 1507 and receiving the second portion of the IFM 1508) occur in the timing diagram for the second processor as the second processor simultaneously at the same time as the first processor processing the first portion of the layer.

As noted previously, both the first and second processors may require the entire weight data array for the layer in order to process a portion of the layer.

Some of the memory requests described in relation to FIG. 15A can be omitted if the weight data or the IFM data is already present in the local buffer. In the embodiment shown in FIG. 15B, the IFM data is already present in the local buffer, and so memory requests only need to be made for the layer weights (which are not already present in the local buffer). Hence, the timing diagram shows the events 1501 and 1505 for requesting the layer weights by each of the processors, and 1502 and 1506 for receiving the layer weights by each of the processors.

Figure 16A:
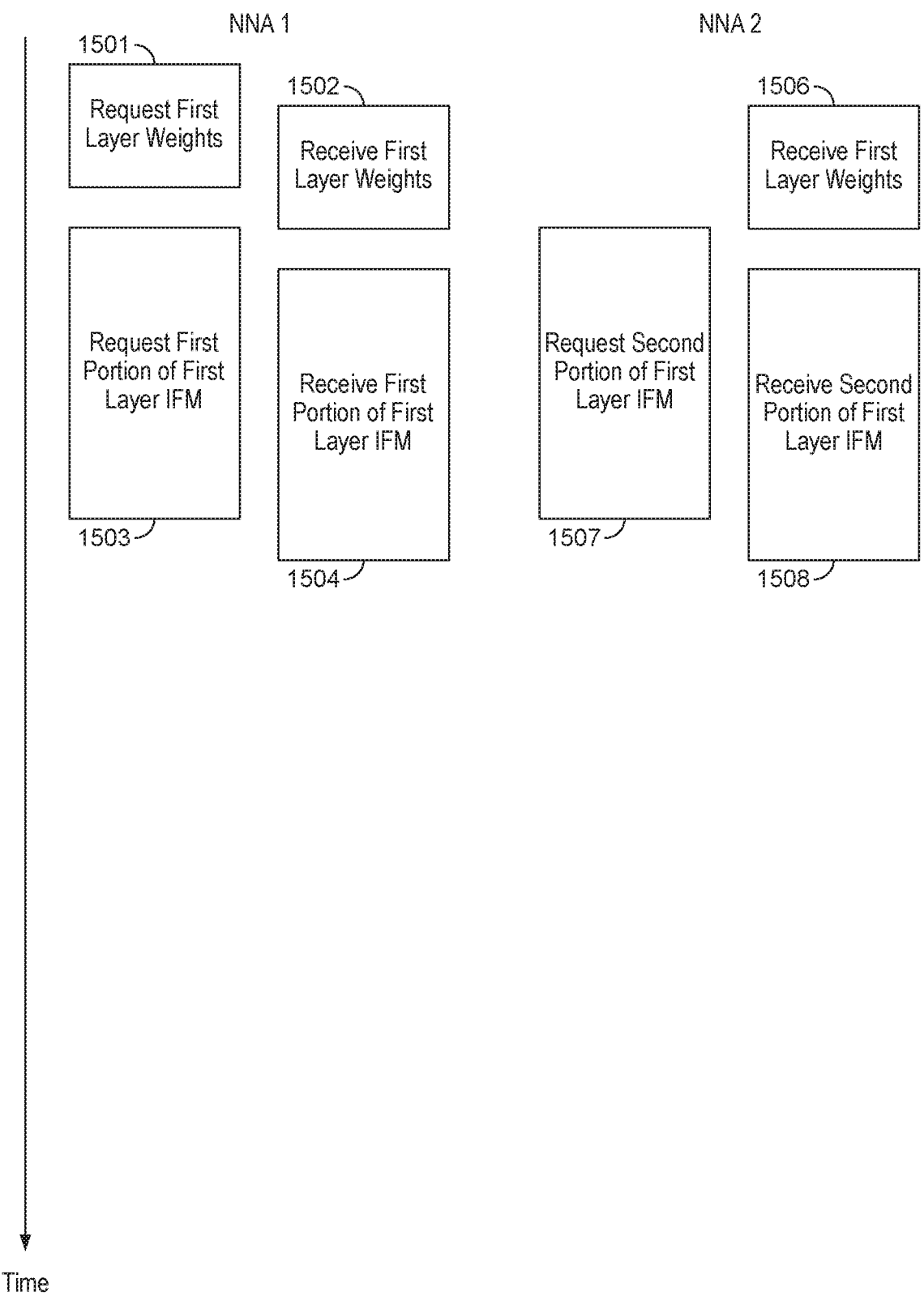
FIGS. 16A and 16B show an optimised process for requesting weight data when two processors are processing the same neural network layers, where weight data is requested by one processor and then broadcast to both of the processors which are processing a layer.

FIG. 16A shows a streamlined process for requesting weight data when two processors are performing processing for different portions of the same layer of a neural network. The process is similar to that shown in FIG. 15A and so like events have been indicated with like numerals. However, as noted previously, the Applicants have recognised that when plural processors are performing processing for different portions of the same layer, each of those processors may still require the same weight data. The Applicants have recognised that it is possible to reduce the number of weight data requests made to memory by sending a weight data request from a single processor only, and then sending the returned weight data to all of the processors that are processing the layer.

Hence, the embodiment of FIG. 16A differs from FIG. 15A in that only the first processor requests the weight data from main memory. The weight data that is returned from the main memory is then sent to both the first and second processors. Hence event 1505 (the second processor requesting layer weights from memory) no longer occurs.

Figure 16B:
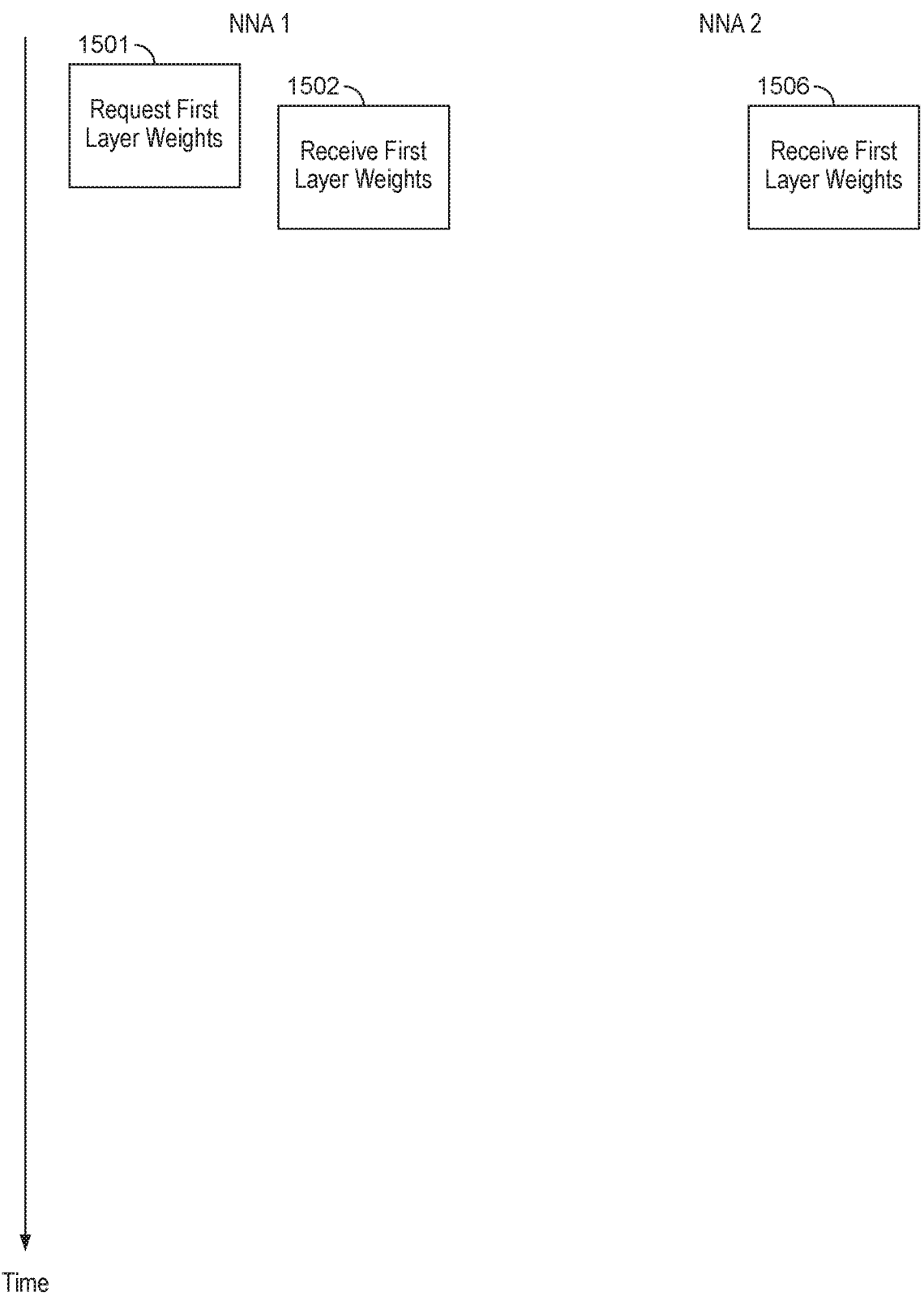

FIG. 16B shows the process of FIG. 16A, but in the case where the required portions of the input feature map are already in local memory (for example an output feature map for a previous layer being stored in the buffer of one processor, and being transferred directly to the buffer of another processor and used as its input feature map data). Hence, events 1503, 1504, 1507 and 1508 (which relate to requesting and receiving input feature map data from main memory) are omitted.

Figure 17A:
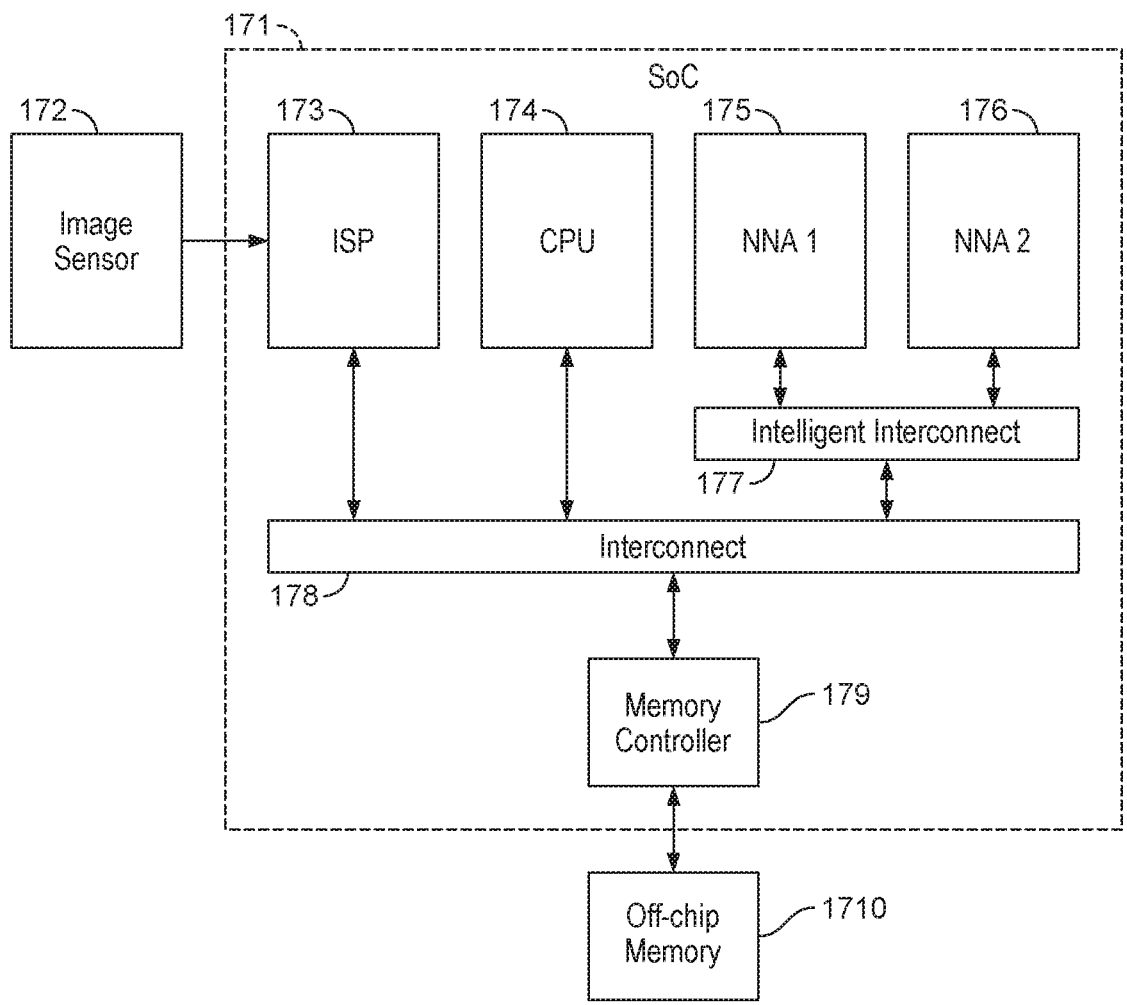
FIG. 17A shows data processing system having an intelligent interconnects between two of the processors for passing weight data requests to the memory controlled and broadcasting weight data to the processors.
Figure 17B:
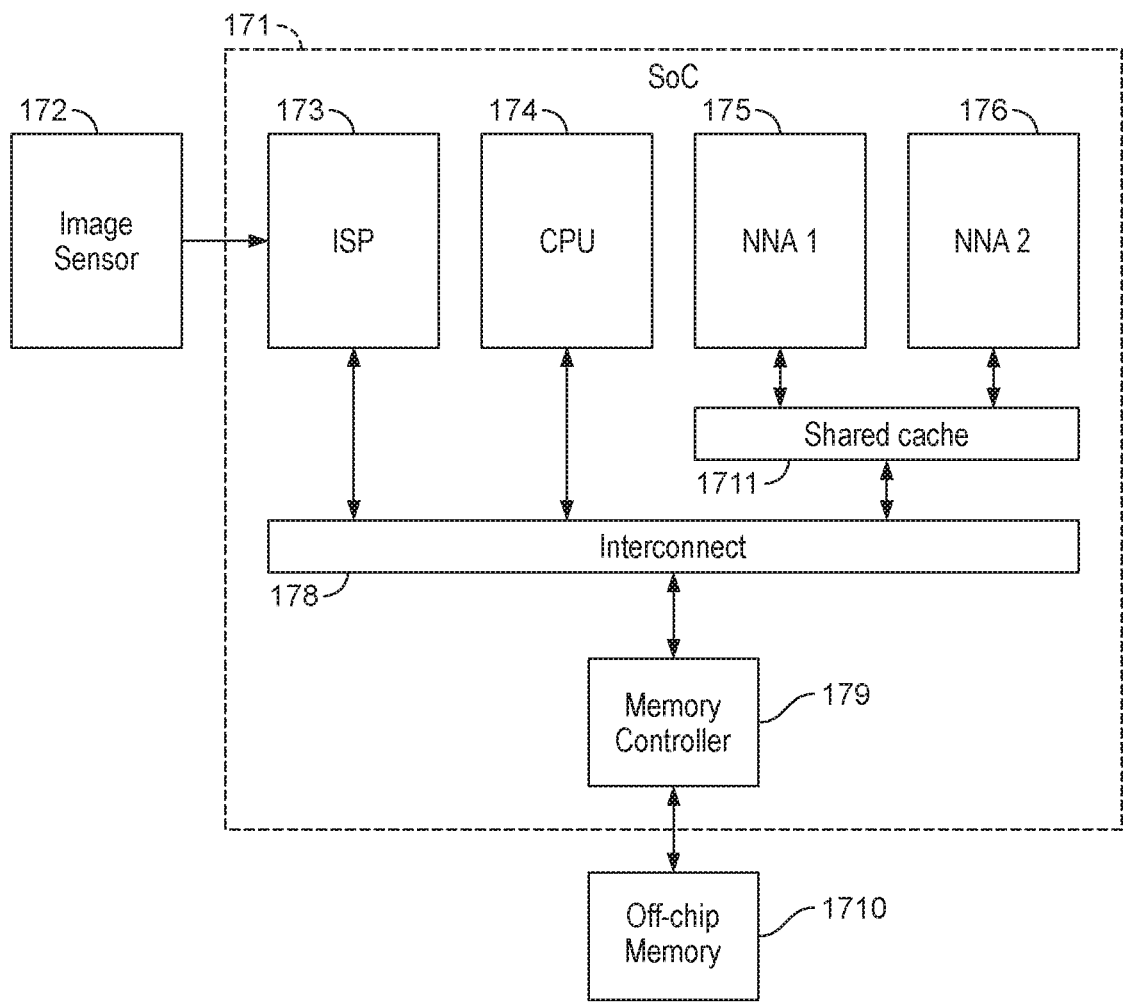
FIG. 17B shows a data processing system having a shared memory which may be accessed by two of the processors.
Figure 17C:
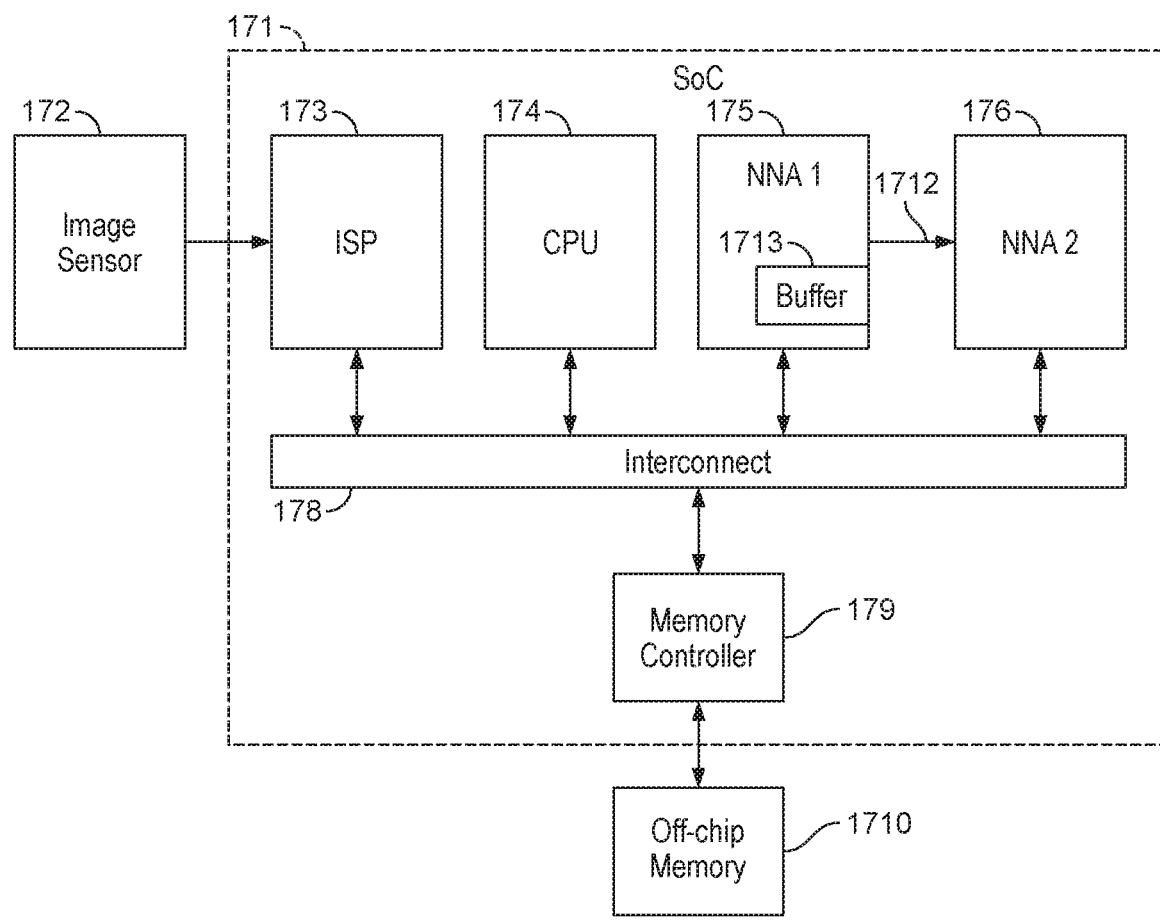
FIG. 17C shows data processing system having a direct interface for passing data between a first and second processor.

FIGS. 17A-C show various embodiments for data processing systems that are capable of executing the data requests described with regards to FIGS. 16A and 16B.

The data processing system 170 is similar to that of FIG. 1, and comprises the following components in common with FIG. 1: an image sensor 172, and an off-chip memory 1710. Within the system-on-chip 171, there is an image signal processor (ISP) 173, central processing unit (CPU), two neural network processors (NNAs) 175, 176, and interconnect 178, and a memory controller 179.

However, FIG. 17A differs in that an intelligent interconnect 177 is provided to which both of the neural network processors 175, 176 have access. When the neural network distribution is such that the neural network processors are assigned different portions of the same layer to process (so that the processors require the same parameter data from memory), a first neural network processor (e.g. NNA1, 175) may request weight data from the main off-chip memory via the intelligent interconnect 177. The intelligent interconnect will communicate the request to the interconnect 178, which in turn passes the request to the memory controller 179. When the requested weight data is returned from the off-chip memory, the intelligent interconnect 177 may be operable to send the weight data to both of the neural network processors 175 and 176.

In an alternative embodiment shown in FIG. 17B the data processor may comprise a local memory (shared cache 1711) to which both of the neural network processors 175 and 176 have access. Other components are the same as in FIG. 17A and are indicated with like numerals.

When a first processor (e.g. processor 175) requests weight data from main memory 1710, the data processing system may be operable to determine whether both neural network processors 175, 176 require that weight data (e.g. the data processing system may determine that processors 175 and 176 have been assigned different parts of the same layer to process). If it is determined that both the processors 175, 176 will require the weight data, then the data processing system may write the weight data to the shared cache 1711 so that both of the processors 175, 176 can access the data by reading the data from the shared cache 1711 and placing the data into their associated local memory.

In another alternative embodiment shown in FIG. 17C a direct interface (connection) 1712 may be provided between the neural network processors 175, 176. The processors may be configured such that, if both of the processors 175, 176 require the same weight data, then a first processor (e.g. processor 175) will request the weight data from off-chip memory 1710. The requested weight data may then be sent to the first processor 175 where is may be stored in a buffer 1713 associated with the first processor. The second processor 176 may be operable to read the required weight data from the buffer 1713 associated with the first processor 175 and to place the data into its own local memory.

The data processing systems of FIGS. 17A-C can therefore be used for data requests when processing a neural network by providing components that allow a single processor to request data from main memory, and then allowing another processor to also access or receive that data without having to also send a request to main memory. This is particularly useful in embodiments where the same weight data is required by plural processors that are processing different portions of a same layer.

The data processing systems of FIGS. 17A-C may also be useful in embodiments where plural processors are assigned different (e.g. consecutive) layers of neural network processing such that the output (e.g. output feature map) from a first layer of processing performed by a first processor is then required as an input (e.g. an input feature map) for a next layer of processing performed by another processor.

For instance, the data processing system of FIG. 17B may be configured such that a feature map that is output from processor 175 when processing a layer is written to shared cache 1711 if the neural network distribution is such that the second processor 176 will require the feature map as an input for processing a next layer of the neural network. This allows processor 176 to read the input feature map directly from the shared cache 1711, rather than having to request the input feature map from main memory.

In an alternative embodiment, the data processing system of FIG. 17C may be configured such that a feature map that is output from processor 175 when processing a layer is sent directly to processor 176 via the interface 1712 if the network distribution is such that the second processor 176 will require the feature map as an input for processing a next layer of the neural network. This allows processor 176 to receive the input feature map directly from first processor 175 rather than having to request the input feature map from main memory.

Alternatively, the data processing systems shown in FIGS. 17A-C could be used to send parts of an output feature map generated by processors executing parts of a layer of neural network processing to processors that require those parts of the output feature map for performing a part of (or an entire) next layer of neural network processing. This may be avoid having to write those parts of the output feature map to main memory and then read those parts from main memory when performing the next layer of neural network processing.

Figure 18A:
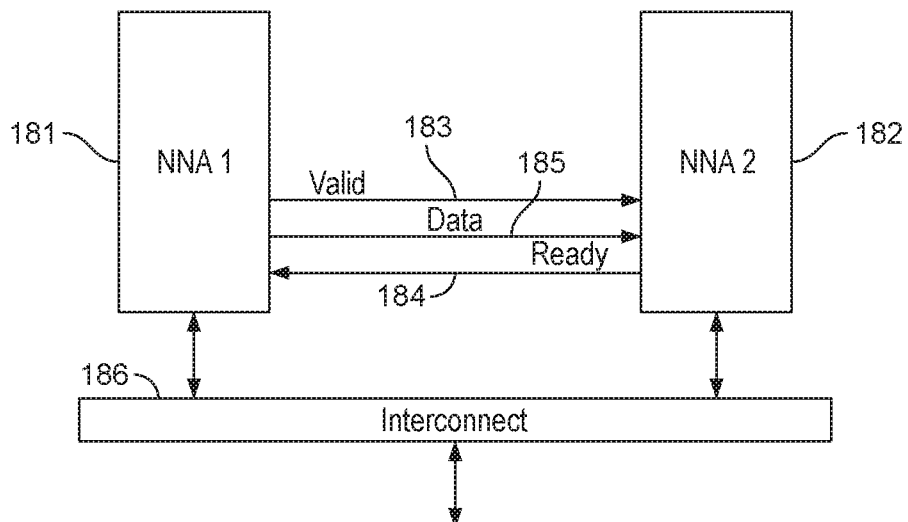
FIGS. 18A-C show various different interfaces between a first and second processor.

The sending (transfer) of data across a direct interface between first and second processors (such as interface 1712 in FIG. 17C) may be controlled by a signalling process, such as that illustrated in FIG. 18A.

FIG. 18A shows a direct interface between processors 181 and 182 which are capable of performing neural network processing. When processor 181 generates data that will be required by processor 182 (e.g. such as an output feature map generated from processing of a layer by processor 181 that will be used as an input feature map for processing a next layer by 182), processor 181 will generate a "valid" signal 183. The "valid" signal is a signal that indicates that valid data is available for sending (transfer) to processor 182.

The processor 182 may generate a "ready" signal 184 when it is ready to receive data. The "ready" signal 184 may be generated in response to the "valid" signal 183.

Alternatively, the "valid" signal 183 may be generated in response to the "ready" signal 184.

In response to the generation of the "ready" signal 184, processor 181 may transfer data to processor 182 (the data transfer is shown by arrow 185).

Both of the processors 181, 182 may be connected to other components of the data processing system by a suitable interconnect 186 (e.g. in the manner described with regards to the other figures).

In the embodiment shown in FIG. 18A, if the second processor 182 is not ready to receive data, then a signal may be generated indicating that further data cannot be accepted by the second processor 182. In response to the generation of the signal indicating that further data cannot be accepted, the data processing system may slow down, or in an embodiment stop ("gate"), the clock of the first processor 181. This will prevent the first processor 181 from overrunning compared to the second processor 182. Once the second processor 182 is ready to receive data, a "ready" signal may be generated.

Figure 18B:
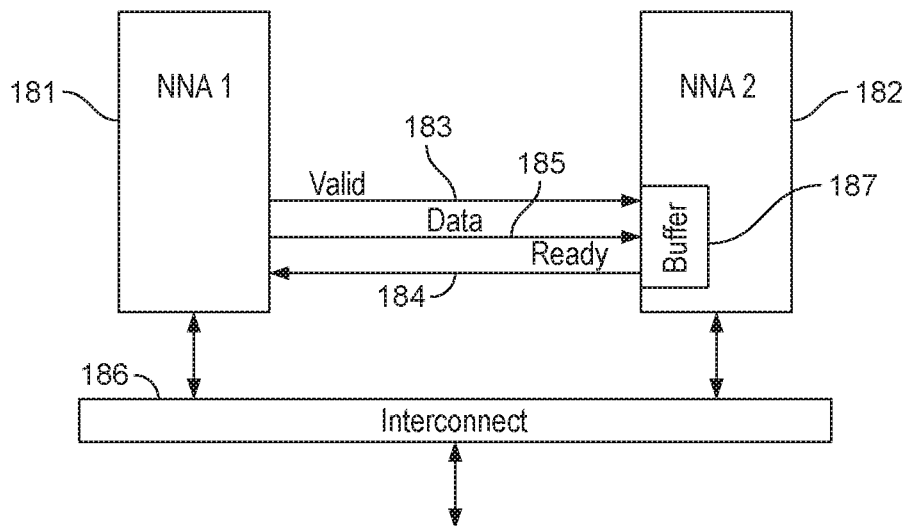

FIG. 18B shows an embodiment similar to FIG. 18A, except there is a buffer 187 associated with processor 182, such that the data transfer (arrow 185) data may comprise transfer of data into the buffer 187 associated with processor 182.

Figure 18C:
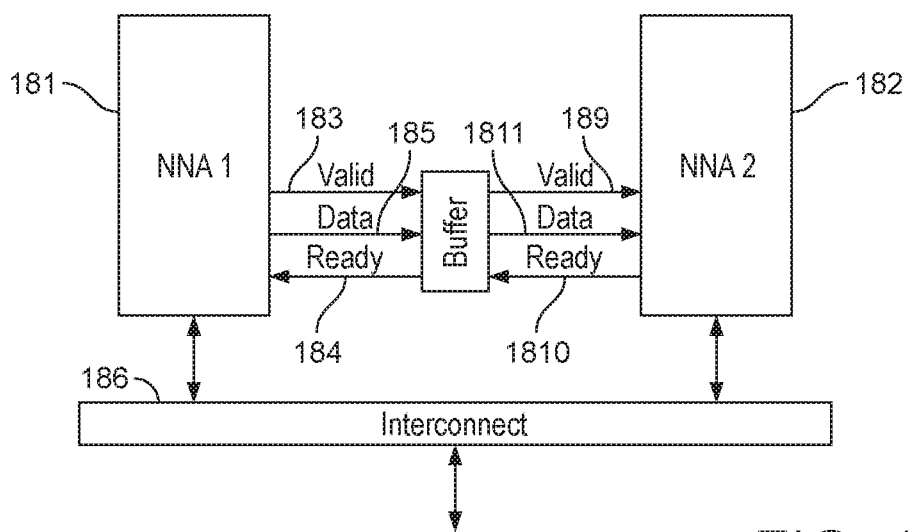

FIG. 18C shows another embodiment wherein data is transferred to shared buffer (similar to shared cache/buffer 1711 shown in FIG. 17B) that both processors 181 and 182 have access to. In this embodiment, processor 181 sends a "valid" signal 183 to the shared buffer 188 when it is ready to send data to the shared buffer 188, and a "ready" signal 184 is generated when the buffer 188 is ready to receive data. On receiving the "ready" signal, the processor then sends data 185 to the buffer.

Similar signalling may be used for transferring data from the buffer to the processor 182. In an embodiment, once the buffer has received data from processor 181, the buffer sends a "valid" signal 189 to the processor 182. Processor 182 sends a "ready" signal 1810 when it is ready to receive data. On receiving the "ready" signal 1810, the buffer then sends data 1811 to the processor 182.

FIGS. 18A-C show the signals and data flow for embodiments where processor 182 requires data that is being generated by processor 181. However, depending on the distribution of neural network processing, the direction in which signals and data are sent may be reversed (e.g. if processor 182 is assigned to perform a first layer of processing, and processor 181 is assigned to process a next layer of processing that requires the output generated by processor 182). Hence, the interfaces between the processors 181, 182 (and the buffer 188 when present) may be bidirectional.

Although FIG. 18C shows a single processor sending data to the shared buffer 188, and a single processor receiving data from the shared buffer, in other embodiments, multiple processors can send data to the shared buffer and/or multiple processors can receive data from the shared buffer.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system, the data processing system comprising a plurality of processors each operable to perform neural network processing, the method comprising, when performing neural network processing:
    determining whether to perform neural network processing using a single processor or using plural processors of the plurality of processors each operable to perform neural network processing; and
    when it is determined that plural processors should be used to perform the neural network processing:
    determining a distribution of the neural network processing to two or more of the processors of the plurality of processors, such that each of the two or more processors is assigned a portion of the neural network processing;
    distributing the portions of the neural network processing to said two or more of the processors according to the determined distribution;

performing the neural network processing by the two or more of the processors, wherein each of the processors performs neural network processing according to the portion of the neural network processing which it has been assigned, to thereby provide a neural network processing output;

wherein the determining the distribution of the neural network processing comprises taking account of an amount of time that each of the two or more processors will require to perform the portion of neural network processing which they have been assigned, and determining whether to modify the operation of a processor to modify the amount of time that the processor will take to perform the portion of the neural network processing which it has been assigned; and when it is determined to modify the operation of the processor, the method further comprising modifying the operation of the processor to modify the amount of time that the processor will take to perform the portion of the neural network processing which it has been assigned.

2. The method of claim 1, wherein the portion of neural network processing assigned to a processor comprises: one or more entire layers of neural network processing; or a part of a layer of neural network processing.

3. The method of claim 1, wherein when it is determined that plural processors should be used for the neural network processing, the distribution of the neural network processing is determined based on at least one of: a current or predicted processing capability of one or more of the processors; and a processing capability required to perform one or more layers of the neural network processing.

4. The method of claim 3, wherein the processing capability required to perform a layer of the neural network processing is determined based on at least one of: a complexity of the layer processing; a size of an input feature map that is to be processed when performing layer processing; a size of an array of weights which is to be used when performing layer processing; a number of features to be extracted when performing the layer processing; and a size of an output feature map that is to be generated when performing layer processing.

5. The method of claim 1, wherein the determining the distribution of the neural network processing comprises taking account of an amount of storage associated with a processor.

6. The method of claim 1, wherein the data processing system comprises a memory that is capable of storing data relating to neural network processing;
and the method comprises, when the neural network distribution is such that a layer is distributed among multiple processors, with each processor being assigned a part of the layer for processing:
each processor requesting from memory parameter data for processing the layer;
wherein the requests from the processors are offset in time.

7. The method of claim 1, wherein the data processing system comprises a memory that is capable of storing data relating to neural network processing;
and the method comprises, when the neural network distribution is such that a layer is distributed among a multiple processors, with each processor being assigned a part of the layer for processing:
when performing processing for the layer, only a single processor of the multiple processors requesting parameter data for processing the layer from memory, and then making the requested parameter data available to all of the multiple processors which are processing the layer.

8. The method of claim 1, wherein the method comprises, when the distribution of neural network processing is such that output data generated by a first processor when performing a first portion of neural network processing which it has been assigned is required by a second processor for performing a second portion of neural network processing which it has been assigned:
the first processor performing the first portion of processing and generating output data;
transferring the output data generated by the first processor to the second processor;
the second processor using the output data that has been transferred as input data when performing the second portion of neural network processing.

9. The method of claim 8 wherein:
the output data from the first processor is transferred directly to the second processor; or
the output data from the first processor is transferred to a buffer associated with the second processor; or
the output data from the first processor is transferred to a shared buffer, wherein the first and second processors both have access to the shared buffer.

10. The method of claim 1, wherein modifying the operation of a processor comprises reducing the clock frequency at which the processor operates.

11. The method of claim 1, wherein modifying the operation of processor comprises offsetting a starting time for processing the portion of the neural network processing which the processor has been assigned.

12. The method of claim 1, wherein the operation of the processor is modified so as to reduce a difference in the amount of time each of the two or more processors will take to perform the portion of neural network processing which they have been assigned.

13. A method of operating a data processing system, the data processing system comprising a plurality of processors each operable to perform neural network processing and a memory capable of storing data relating to neural network processing, the method comprising, when performing neural network processing:
determining whether to perform neural network processing using a single processor or using plural processors of the plurality of processors each operable to perform neural network processing; and
when it is determined that plural processors should be used to perform the neural network processing:
determining a distribution of the neural network processing to two or more of the processors of the plurality of processors, such that each of the two or more processors is assigned a portion of the neural network processing;
distributing the portions of the neural network processing to said two or more of the processors according to the determined distribution;
performing the neural network processing by the two or more of the processors, wherein each of the processors performs neural network processing according to the portion of the neural network processing which it has been assigned, to thereby provide a neural network processing output;
and wherein the method further comprises multiple processors requesting from memory data for performing the portion of neural network processing they have respectively been assigned, wherein the requests from the processors are offset in time.

14. The method of claim 13, further comprising offsetting a time at which each processor of the multiple processors that requires the data starts performing its assigned portion of neural network processing so that the requests from the processors to memory are offset in time.

15. The method of claim 13, further comprising adjusting the clock frequency of one or more of the processors that require the data so that the requests from the processors to the memory are offset in time.

16. A method of operating a data processing system, the data processing system comprising a plurality of processors each operable to perform neural network processing and a memory capable of storing data relating to neural network processing, the method comprising, when performing neural network processing:

determining whether to perform neural network processing using a single processor or using plural processors of the plurality of processors each operable to perform neural network processing; and when it is determined that plural processors should be used to perform the neural network processing:

determining a distribution of the neural network processing to two or more of the processors of the plurality of processors, such that each of the two or more processors is assigned a portion of the neural network processing;

distributing the portions of the neural network processing to said two or more of the processors according to the determined distribution;

performing the neural network processing by the two or more of the processors, wherein each of the processors performs neural network processing according to the portion of the neural network processing which it has been assigned, to thereby provide a neural network processing output;

and wherein the method further comprises, when the neural network distribution is such that multiple processors will require the same data stored in memory when performing their assigned portions of neural network processing, only a single processor requesting the data from the memory, and then making the requested data available to all of the multiple processors that require the same data.

\* \* \* \* \*